US010568002B2

(12) United States Patent
Harrington

(10) Patent No.: US 10,568,002 B2
(45) Date of Patent: Feb. 18, 2020

(54) METHOD AND SYSTEM FOR MULTIPLE CARRIER RESOURCE ALLOCATION IN LTE-ADVANCED NETWORKS

(71) Applicant: Leidos, Inc., Reston, VA (US)

(72) Inventor: Rebecca K. Harrington, Arlington, VA (US)

(73) Assignee: Leidos, Inc., Reston, VA (US)

( * ) Notice: Subject to any disclaimer, the term of this patent is extended or adjusted under 35 U.S.C. 154(b) by 0 days.

(21) Appl. No.: 16/153,968

(22) Filed: Oct. 8, 2018

(65) Prior Publication Data
US 2019/0059025 A1    Feb. 21, 2019

Related U.S. Application Data

(60) Continuation of application No. 15/854,113, filed on Dec. 26, 2017, now Pat. No. 10,104,581, which is a
(Continued)

(51) Int. Cl.
*H04M 11/00* (2006.01)
*H04W 28/24* (2009.01)
(Continued)

(52) U.S. Cl.
CPC .......... *H04W 28/24* (2013.01); *H04W 4/00* (2013.01); *H04M 15/805* (2013.01);
(Continued)

(58) Field of Classification Search
CPC .......... H04M 15/8044; H04M 15/805; H04M 15/8055; H04W 28/24; H04W 4/00; H04W 4/24
(Continued)

(56) References Cited

U.S. PATENT DOCUMENTS

| 9,232,400 | B2 | 1/2016 | Singh et al. | |
|---|---|---|---|---|
| 2008/0002635 | A1* | 1/2008 | Mosko | H04W 28/14 370/338 |
| 2012/0311652 | A1* | 12/2012 | Garg | H04N 21/2385 725/116 |

OTHER PUBLICATIONS

M. F. L. Abdullah and A. Z. Yonis, Performance of LTE Release 8 and Release 10 in Wireless Communications, in Cyber Security, Cyber Warfare and Digital Forensic (CyberSec), 2012 International Conference, pp. 236-241, Jun. 2012.

(Continued)

*Primary Examiner* — Ronald Eisner
(74) *Attorney, Agent, or Firm* — Dawn-Marie Bey; Bey & Cotropia PLLC

(57) ABSTRACT

A process for selecting an optimal individual user solution including an optimal rate allocation and associated price for a predetermined bandwidth of cellular network resources includes application of an iterative process and selection from multiple proposed user solutions. The inputs to the iterative process include at least an initial user bid, an initial network rate allocation, a generated user utility function and the cost data. The user utility function includes multiple application user functions. Optimal solution selection includes comparing each multiple proposed user rate allocation with the initial network rate allocation for the user and selecting the closest multiple proposed user rate allocation to the initial network rate allocation. The process may be applied to aggregated cellular carrier scenarios.

7 Claims, 41 Drawing Sheets

Related U.S. Application Data continuation of application No. 15/210,142, filed on Jul. 14, 2016, now Pat. No. 9,854,475, which is a division of application No. 14/209,430, filed on Mar. 13, 2014, now Pat. No. 9,414,216.

(60) Provisional application No. 61/787,317, filed on Mar. 15, 2013.

(51) Int. Cl.
    *H04W 4/00* (2018.01)
    *H04M 15/00* (2006.01)
    *H04W 4/24* (2018.01)

(52) U.S. Cl.
    CPC .... *H04M 15/8044* (2013.01); *H04M 15/8055* (2013.01); *H04W 4/24* (2013.01)

(58) Field of Classification Search
    USPC ..... 455/405–408, 422.1, 450–455, 464, 509; 370/328–337, 339, 341–348, 431–463
    See application file for complete search history.

(56) References Cited

OTHER PUBLICATIONS

A. F. Cattoni, et al., "Multi-User MIMO and Carrier Aggregation in 4G Systems: The SAMURAI Approach," in Wireless Communications and Networking Conference Workshops (WCNCW), 2012 IEEE, pp. 288-293, Apr. 2012.
Dahlman, S. Parkvall, and J. Skold, "4G: LTE/LTE-Advanced for Mobile Broadband: LTE/LTE-Advanced for Mobile Broadband," Academic Press, 2011.
F. P. Kelly, et al., "Rate Control for Communication Networks: Shadow Prices, Proportional Fairness and Stability," Journal of the Operational Research Socieity, 49(3):237-252, 1998.
M. Li, Z. Chen and Y. Tan, "A MAXMIN Resource Allocation Approach for Scalable Video Delivery Over Multiuser MIMO-OFDM Systems," In Circuits and Systems (ISCAS), 2011 IEEE International Symposium, pp. 2645-2648, May 2011.
L. Liu, M. Li, J. Zhou, X. She, L. Chen, Y. Sagae, and M. Iwamura, "Component Carrier Management for Carrier Aggregation in LTE-Advanced System," In Vehicular Technology Conference (VTC Spring), 2011 IEEE 73rd, pp. 1-6, May 2011.
L. Lock, et al., "Simulation of Time-Varying, Frequency-Selective Multipath Fading Channels for Spread-Spectrum Waveforms," In Signals, Systems, and Computers, 1999.
M. Mikofski, "Polyfitzero," www.mathworks.com.
R. S. Prabhu and B. Daneshrad, "An Energy-Efficient Water-Filling Algorithm for OFDM Systems," In Communications (ICC), 2010 IEEE International Conference, pp. 1-5, May 2010.
R. Ratasuk, D. Tolli, and A. Ghosh, "Carrier Aggregation in LTE-Advanced," In Vehicular Technology Conference (VTC 2010—Spring), 2010 IEEE 71st, pp. 1-5, May 2010.
V. Stencel, et al., "LTD Advanced—A Further Evolutionary Step for Next Generation Mobile Networks," In Radioelektronika (RADIOELEKTRONIKA), 2010 20th International Conference, pp. 1-5, Apr. 2010.
W. Shen, et al., "Cost-Function-Based Network Selection Strategy in Integrated Wireless and Mobile Networks," Vehicular Technology, IEEE Transactions, 57(6):3778-3788, Nov. 2008.
Z. Shen, et al., "Overview of 3GPP LTE-Advanced Carrier Aggregation for 4G Wireless Communications," Communications Magazine, IEEE, 50(2):122-130, Feb. 2012.
R. Sivaraj, et al., "Edge-Prioritized Channel- and Traffic-Aware Uplink Carrier Aggregation in LTE-Advanced Systems," In World of Wireless, Mobile and Multimedia Networks (WoWMoM), 2012 IEEE International Symposium, pp. 1-9, Jun. 2012.
J. I. Smith, "A Computer Generated Multipath Fading Simulation for Mobile Radio," Vehicular Technology, IEEE Transactions, 24(3):39-40, Aug. 1975.
S. Songsong, et al., "A Resource Scheduling Algorithm Based on User Grouping for LTE-Advanced System With Carrier Aggregation," In Computer Network and Multimedia Technology, 2009, CNMT 2009, International Symposium, pp. 1-4, Jan. 2009.
S. Thakolsri, et al., "Application-Driven Cross Layer Optimization for Wireless Networks Using Mos-Based Utility Functions," In Communications and Networking in China, 2009, ChinaCOM 2009, Fourth International Conference, pp. 1-5, Aug. 2009.
G. Vivier, et al., "Spectrum Aggregation: Initial Outcomes From SAMURAI Project," In Future Network Mobile Summit (FutureNetw), 2011, pp. 1-9, Jun. 2011.
IP Voice Over and P.C.B. Consumption, Cisco Systems, 7934, 2006.
Y. Wang, et al., "Resource Allocation Considerations for Multi-Carrier LTE-Advanced Systems Operating in Backward Compatible Mode," In Personal, Indoor and Mobile Radio Communications, 2009 IEEE 20th International Symposium, pp. 370-374, Sep. 2009.
Y. Wang, et al., "Utility Maximization in LTE-Advanced Systems With Carrier Aggregation," In Vehicular Technology Conference (VTC Spring), 2011 IEEE 73rd, pp. 1-5, May 2011.
G. Yuan, X. Zhang, W. Wang, and Y. Yang, "Carrier Aggregation for LTE-Advanced Mobile Communication Systems," Communications Magazine, IEEE, 48(2):88-93, Feb. 2010.
Y. Zhao, et al., "Experimental Study of Utility Function Selection for Video Over IEEE 802.22 Wireless Regional Area Networks," In Testbeds and Research Infrastructures for the Development of Networks Communities and Workshops, 2009, TridentCom 2009, 5th International Conf., pp. 1-10, Apr. 2009.
A. Z. Yonis, et al., "Effective Carrier Aggregation on the LTE-Advanced Systems," International Journal of Advanced Science and Technology, vol. 41, Apr. 2012, 12 pp.

\* cited by examiner

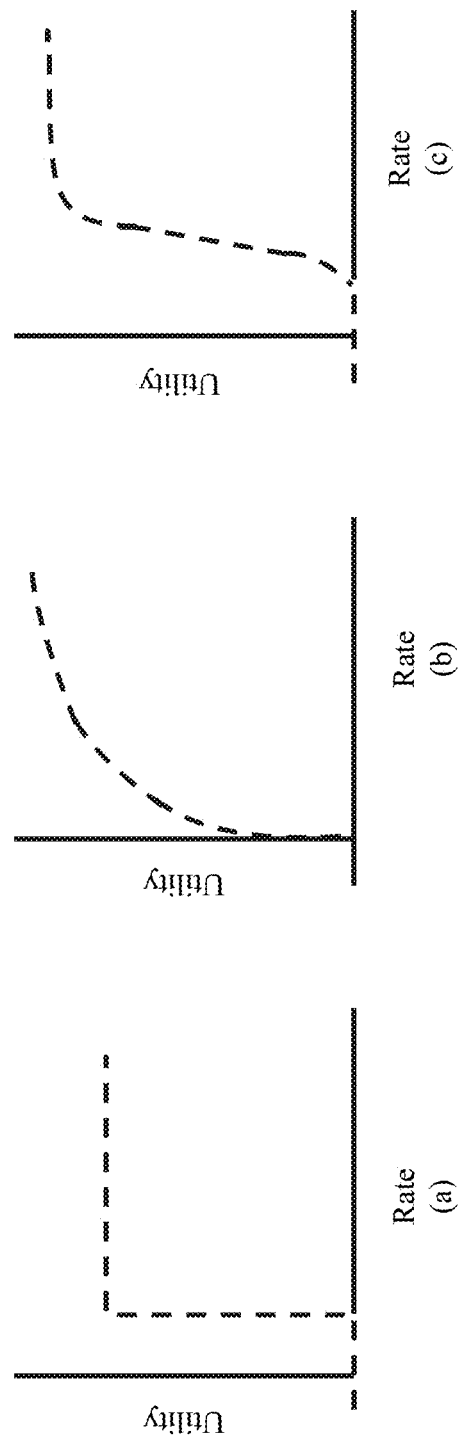
Figure 1: Example Utility Functions

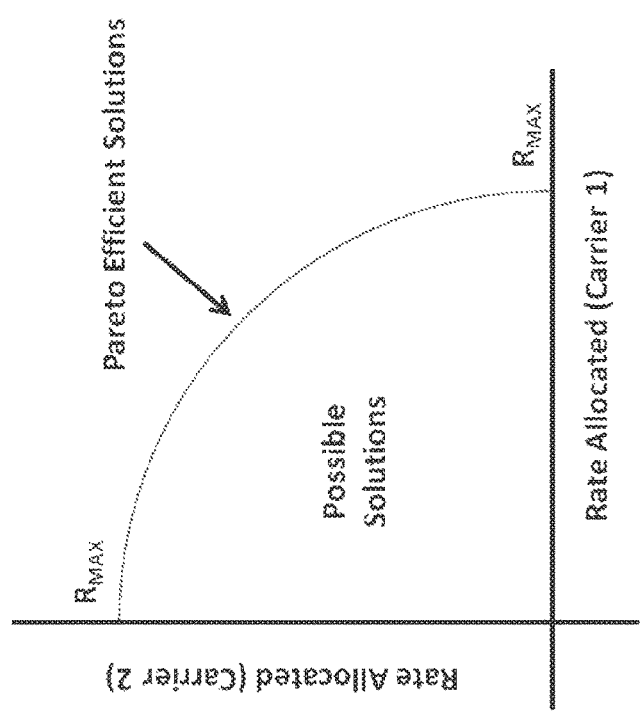

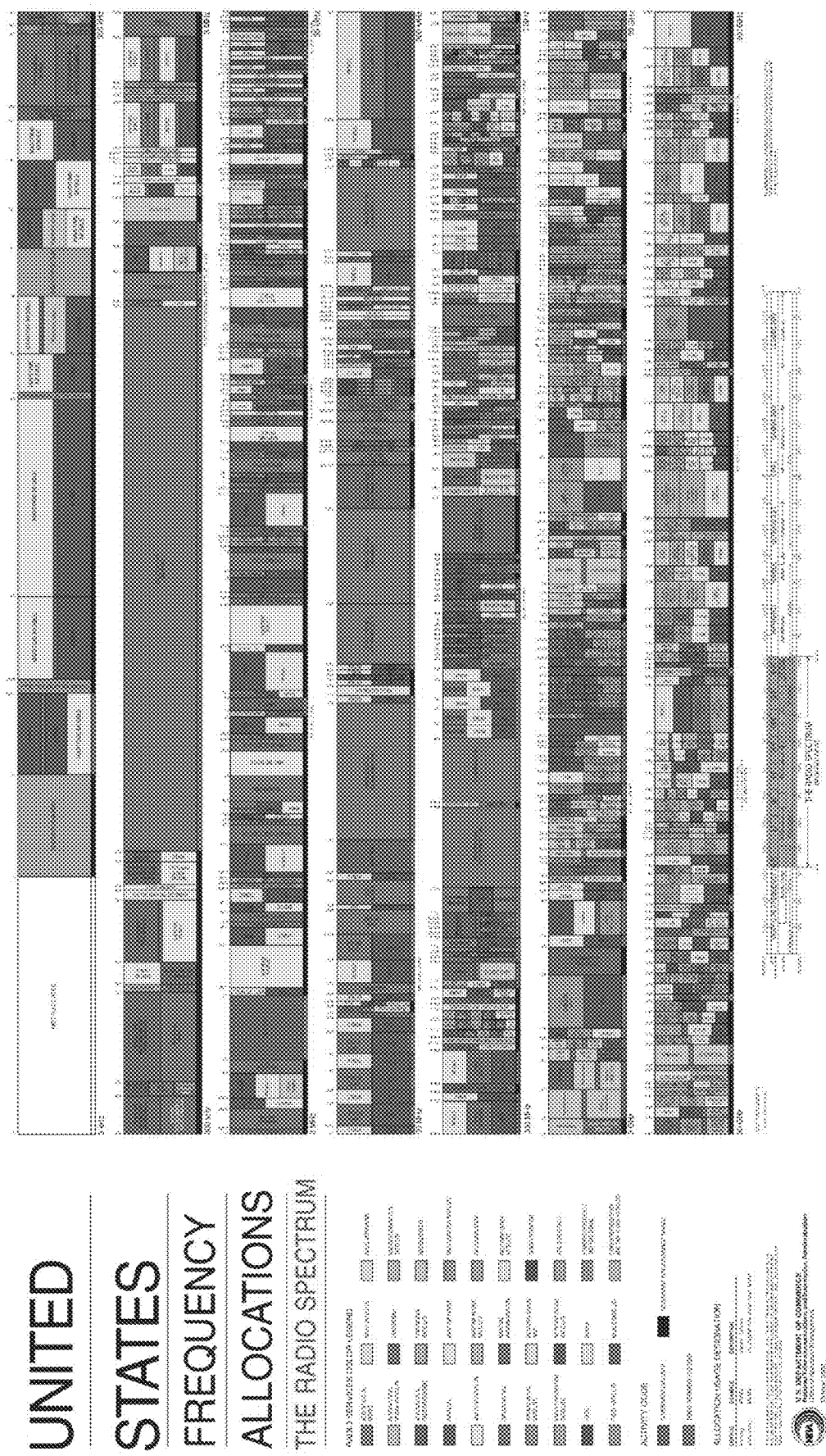
Figure 3: PRIOR ART – US Frequency Spectrum Allocation

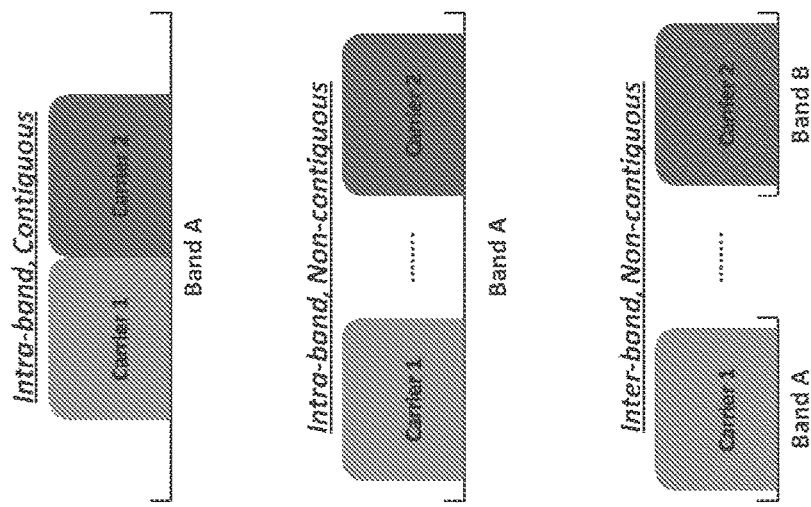
Figure 4: Carrier Aggregation Scenarios in Frequency

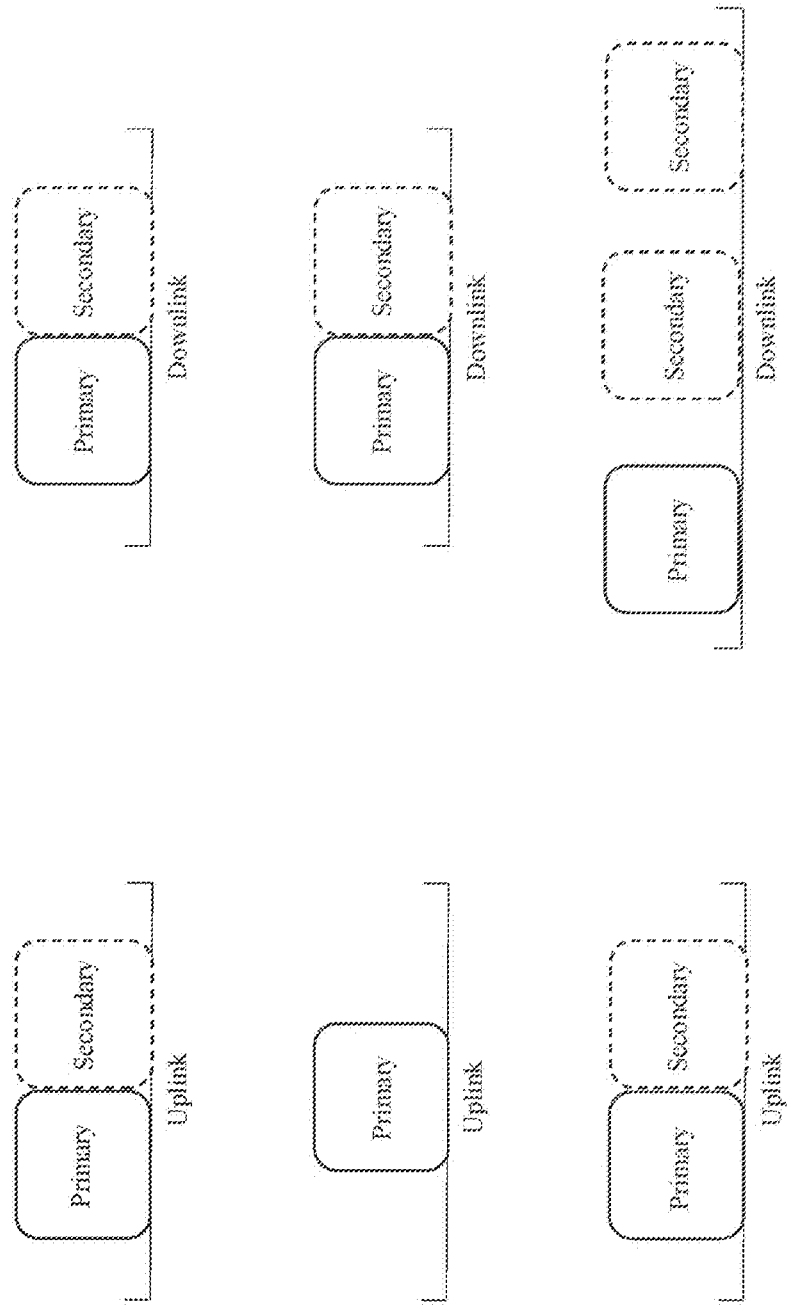

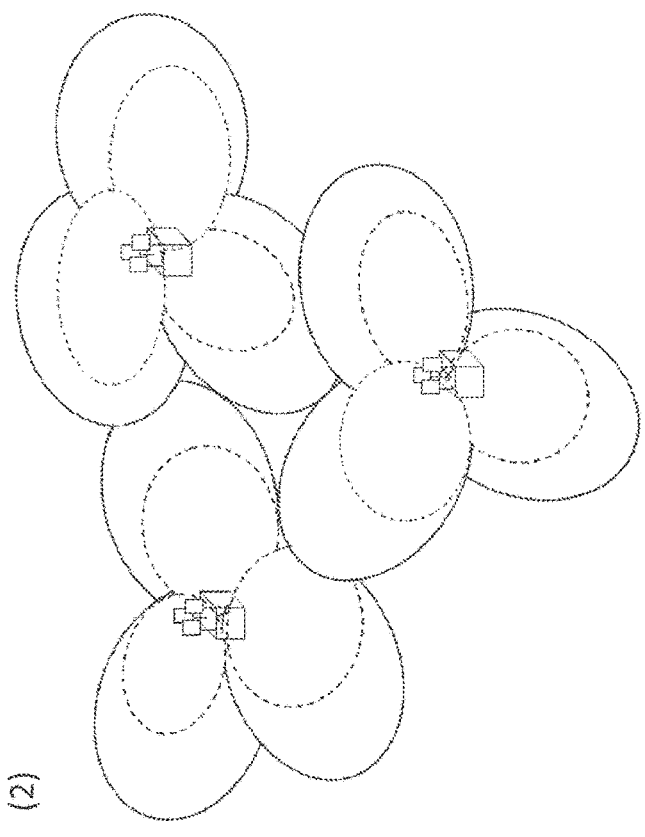
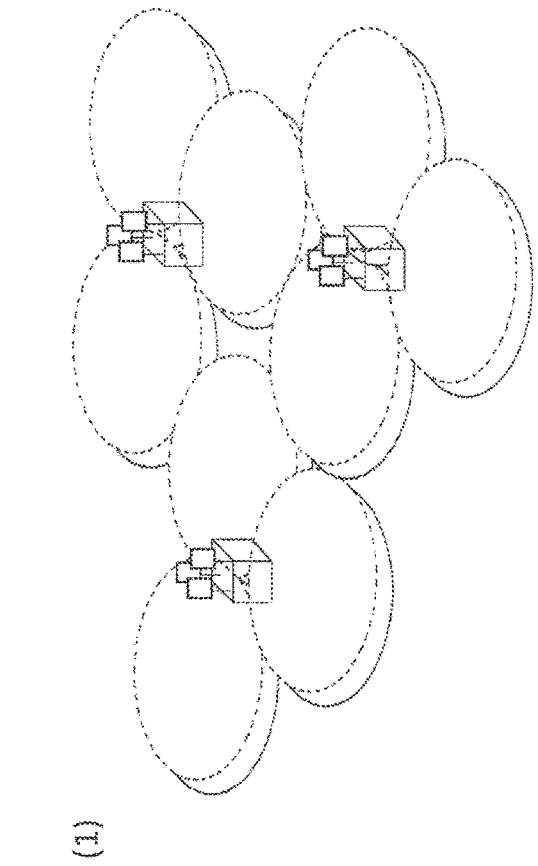
Figures 6(1) and 6(2): Base Station Scenarios

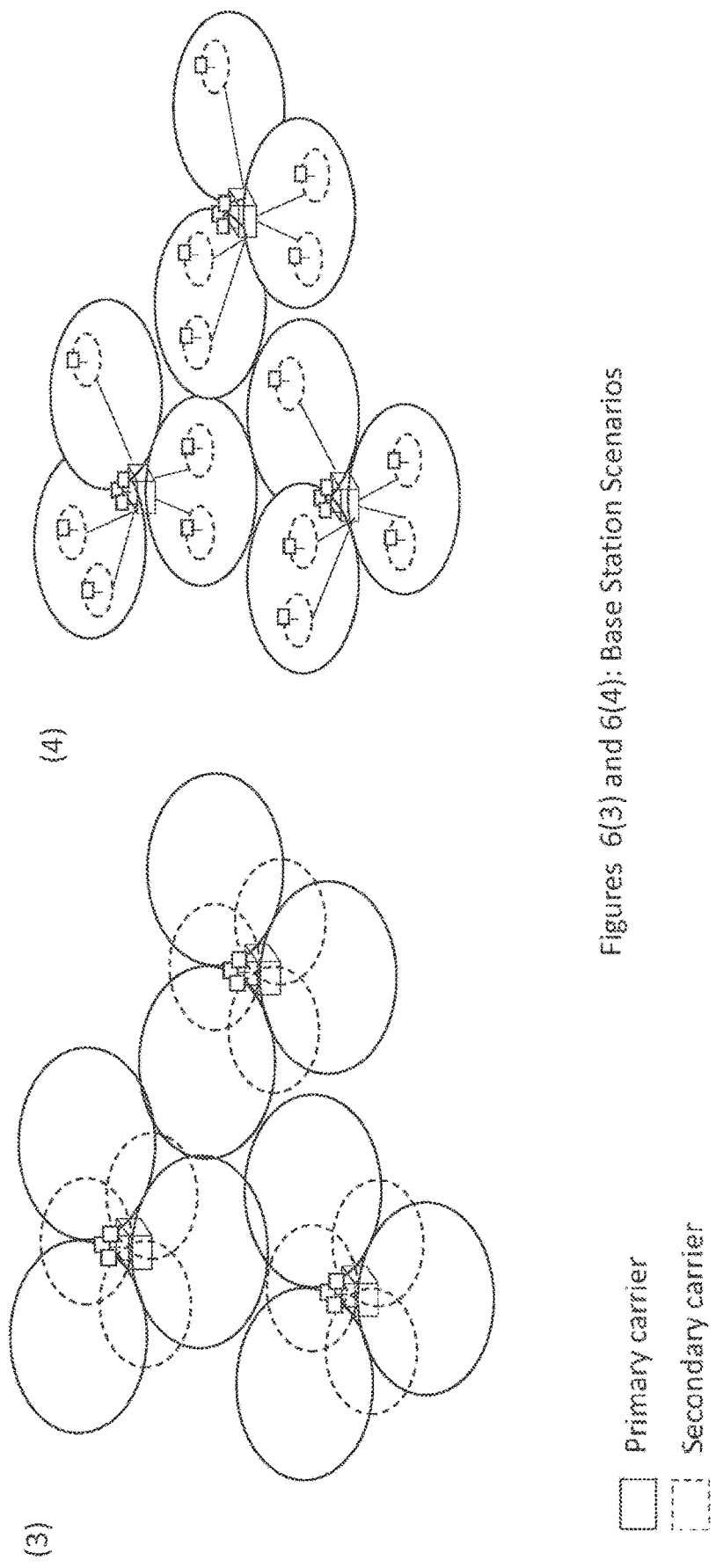
Figures 6(3) and 6(4): Base Station Scenarios

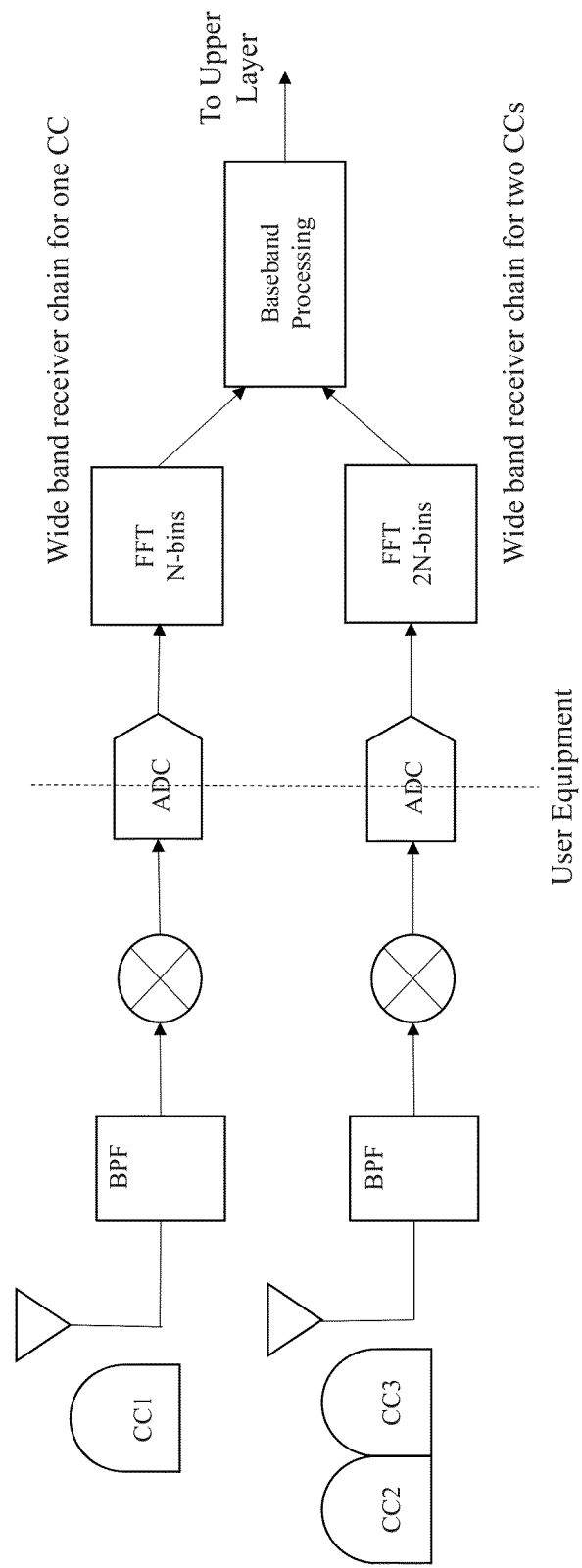
Figure 7: User Equipment Example

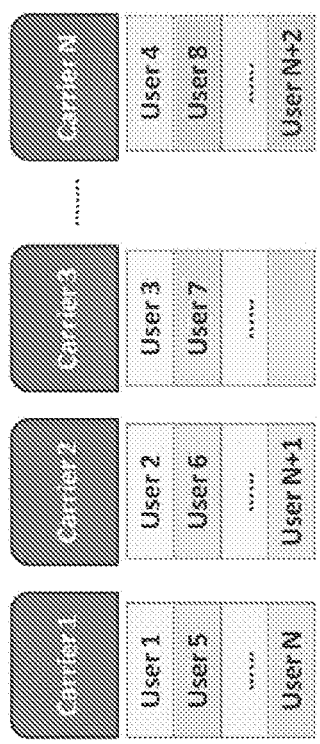
Figure 8: Round Robin Scheduling

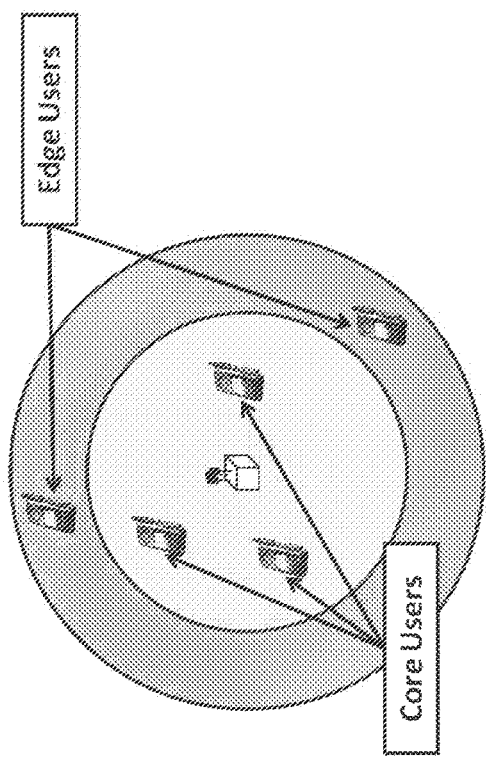
Figure 9: Edge versus Core Users

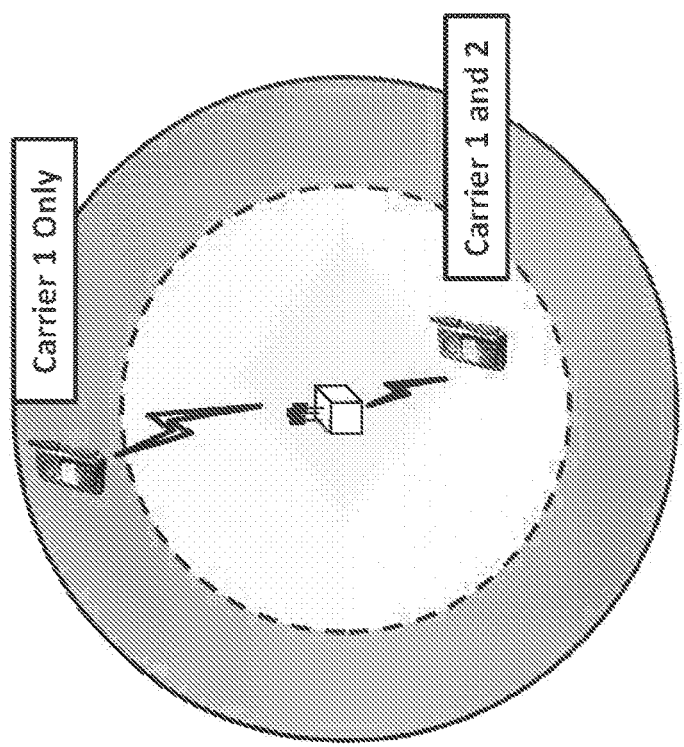

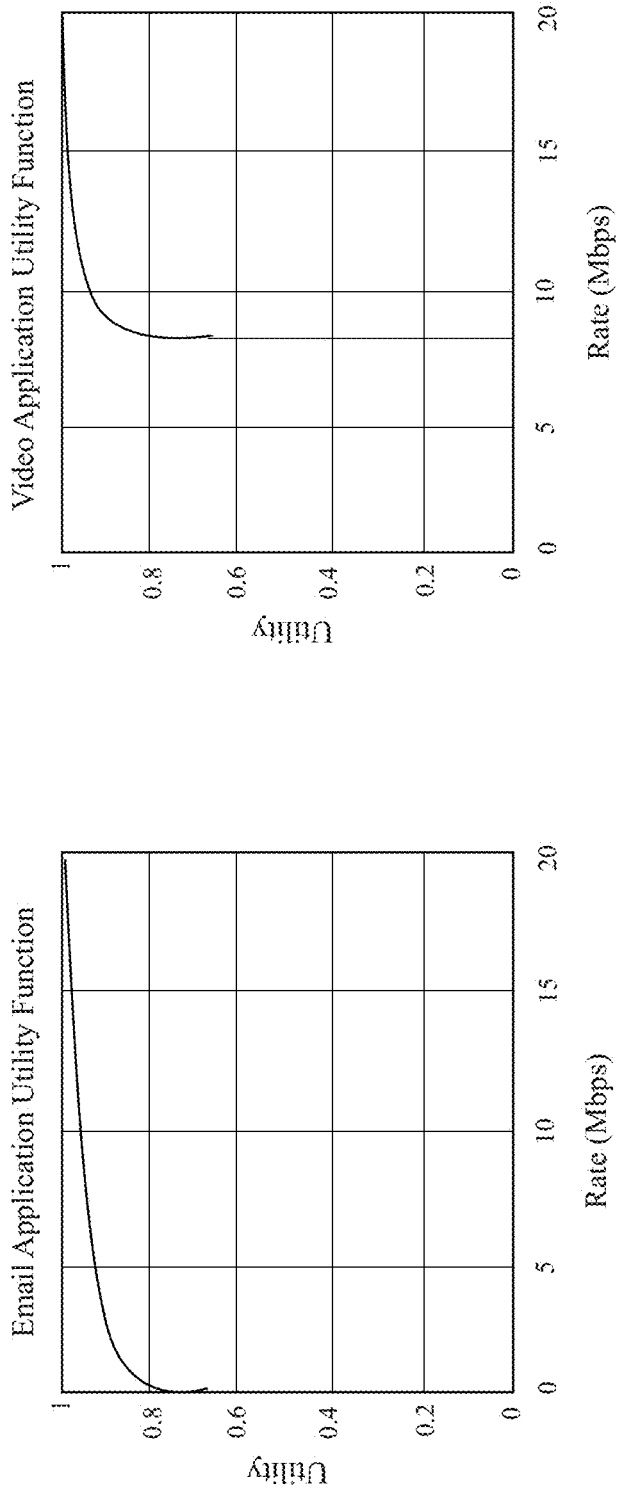
Figure 11: Example Application Utility Functions

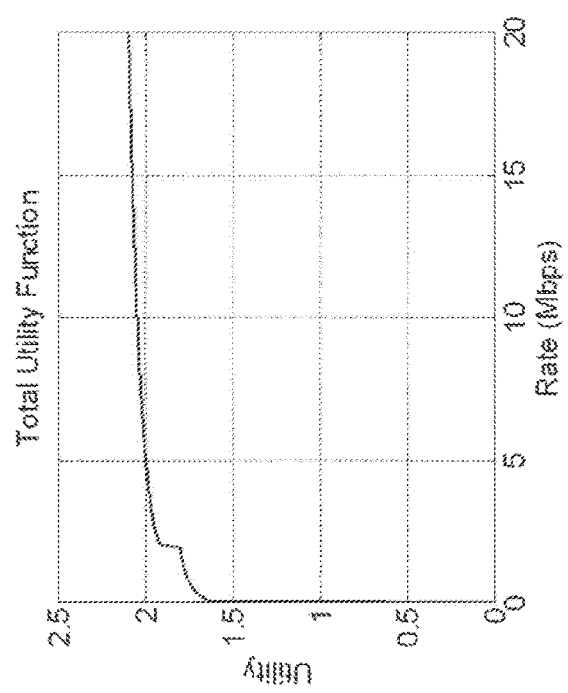
Figure 12: Total Utility Function Example

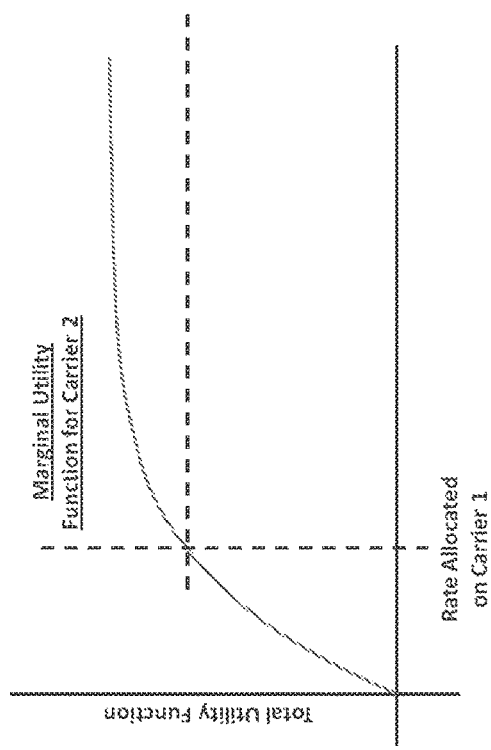
Figure 13: Marginal Utility Example

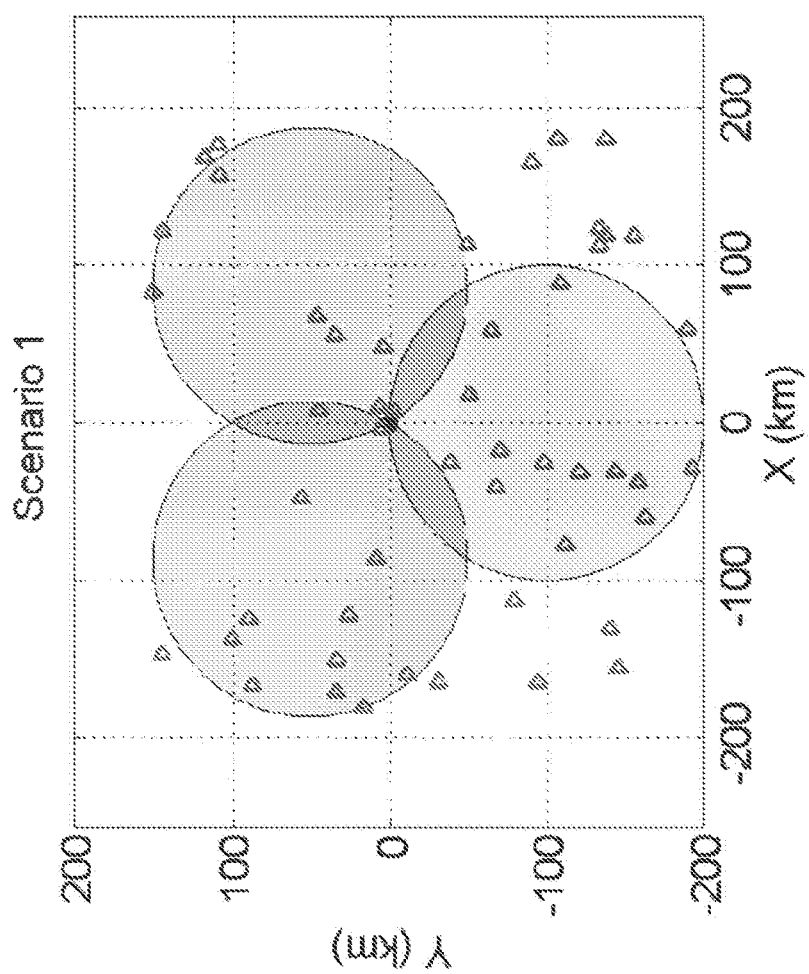
Figure 14: Example MATLAB Scenario 1

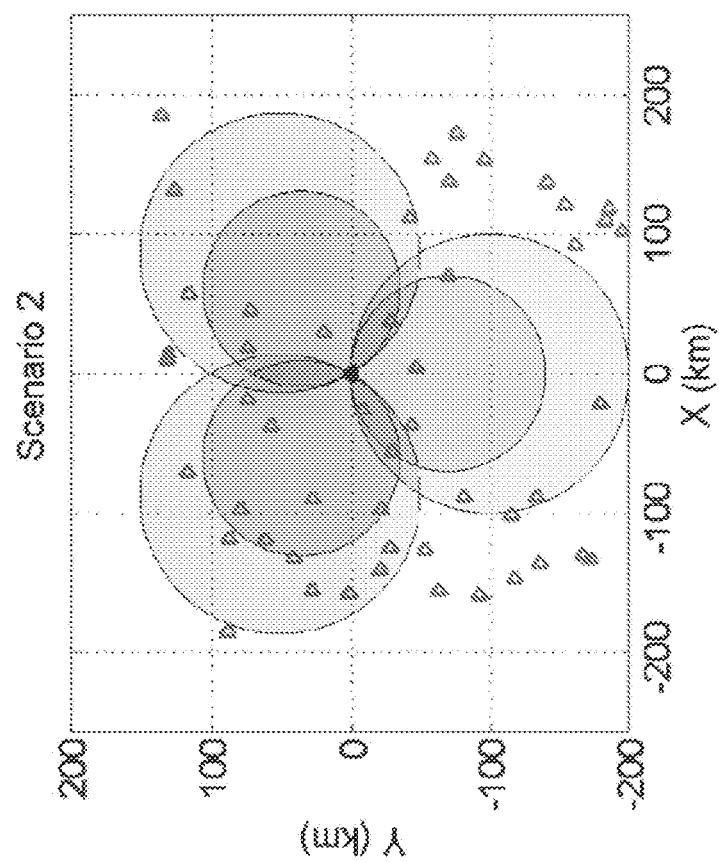
Figure 15: Example MATLAB Scenario 2

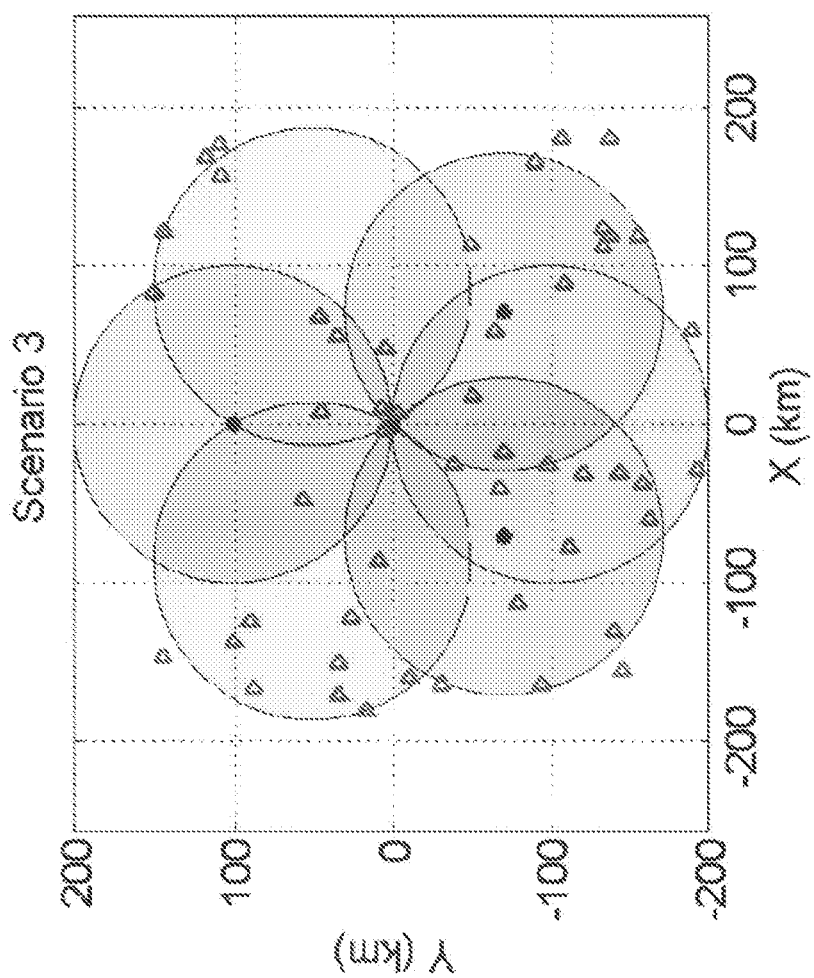
Figure 16: Example MATLAB Scenario 3

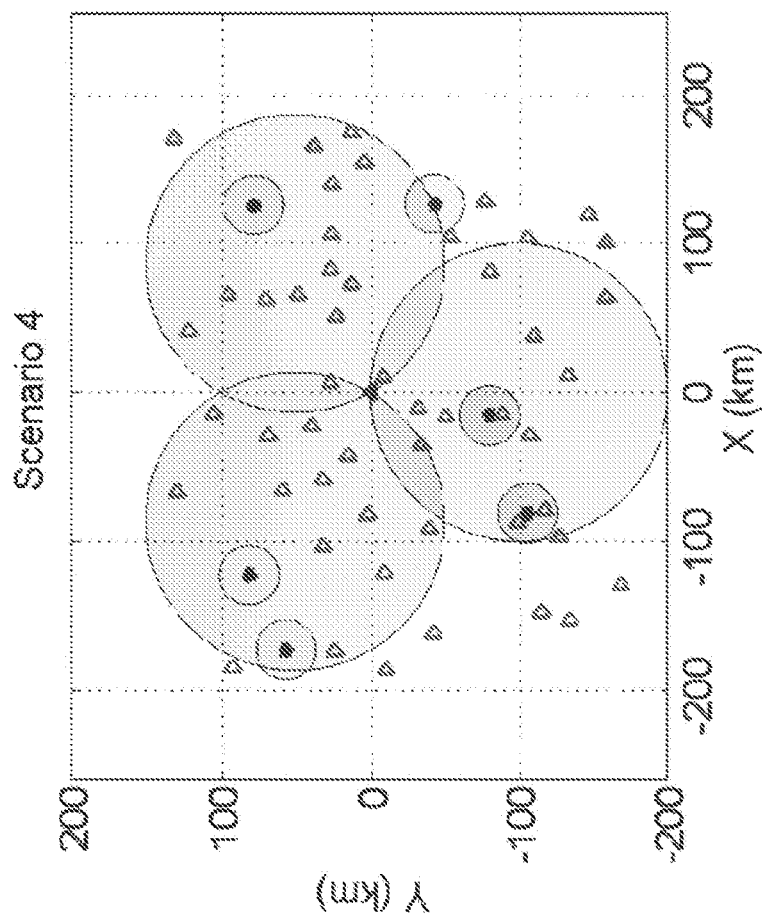
Figure 17: Example MATLAB Scenario 4

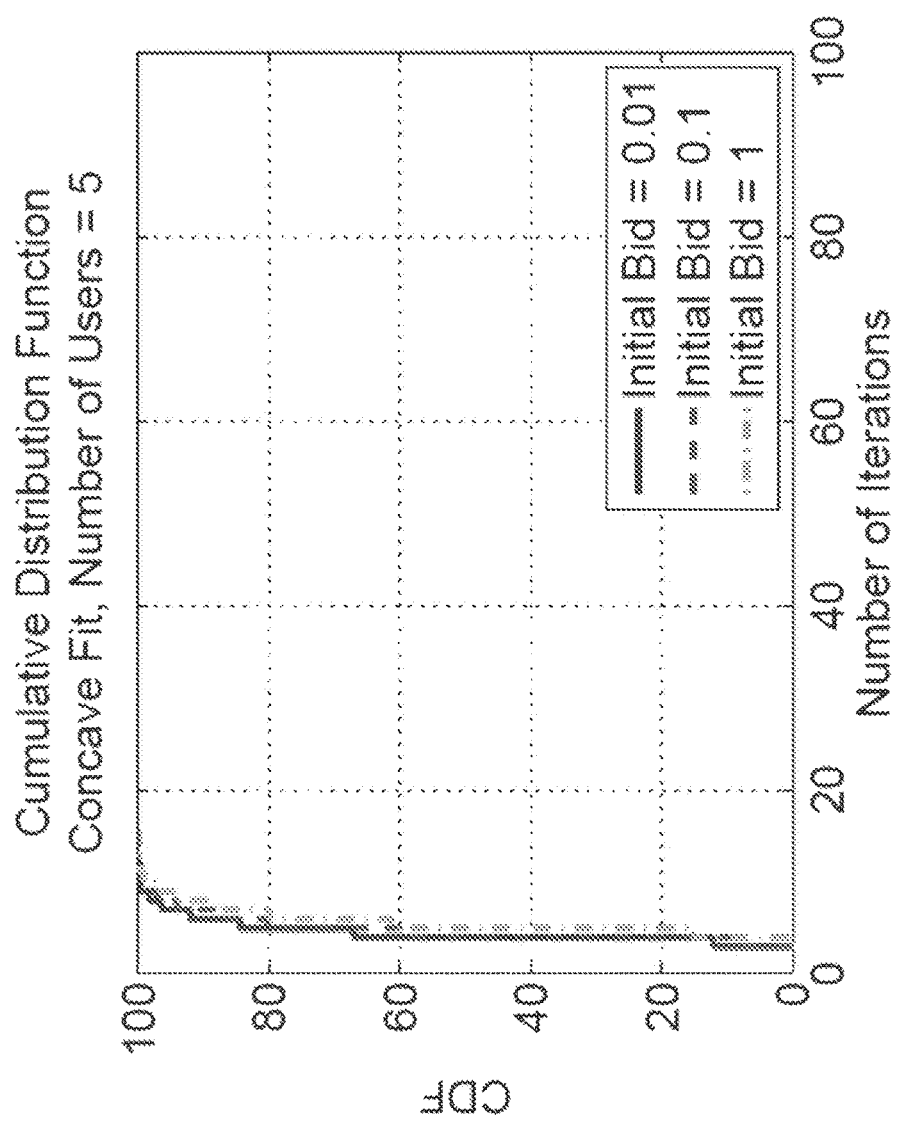
Figure 18: Concave Fit Utility Function Convergence, 5 Users

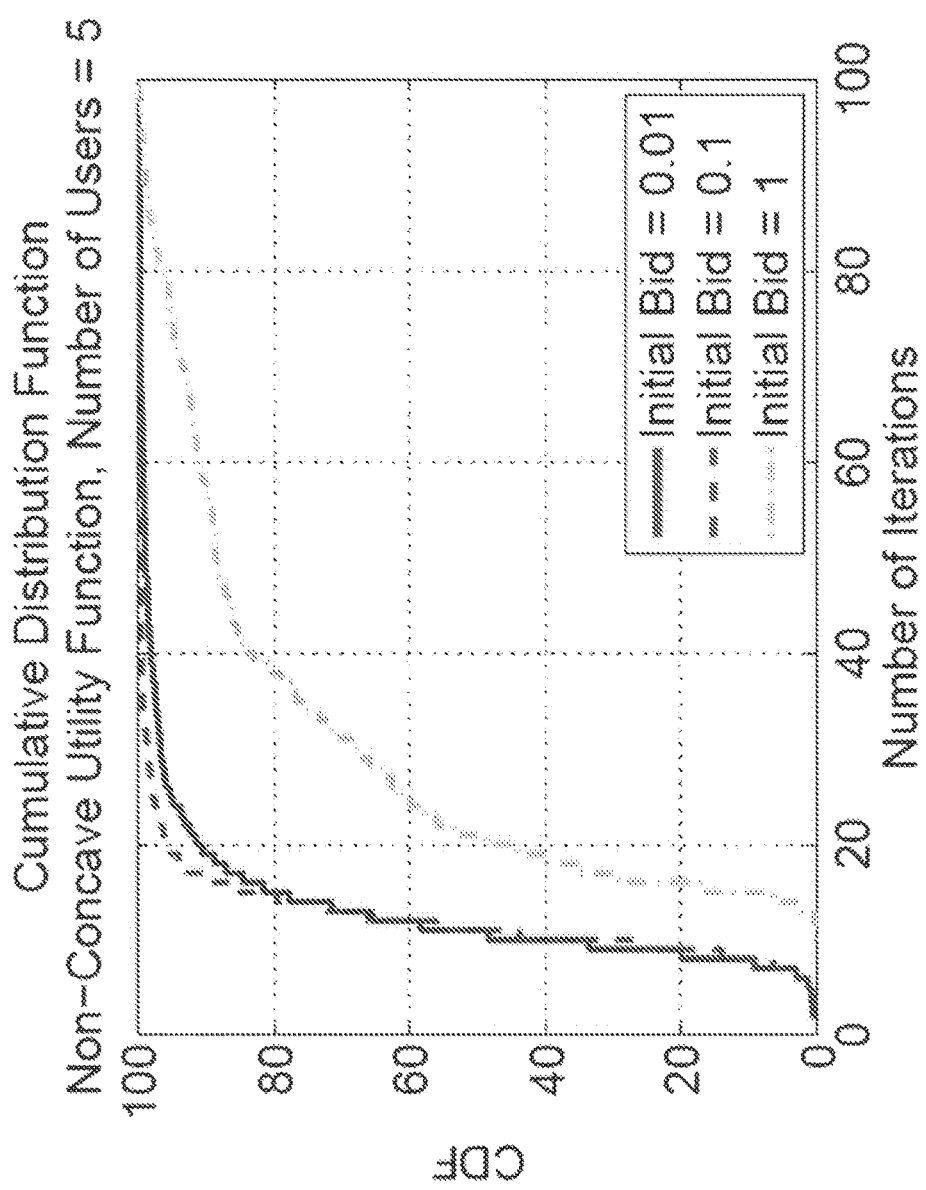
Figure 19: Non-Concave Utility Function Convergence, 5 Users

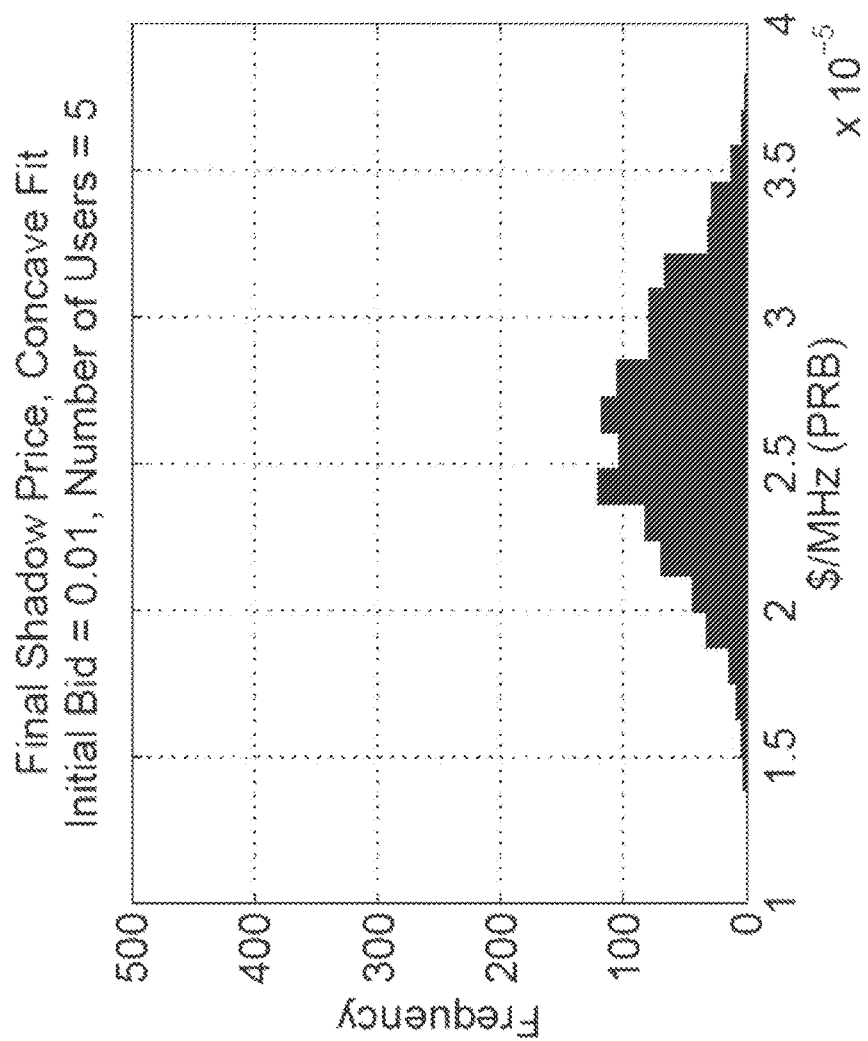
Figure 20: Shadow Prices for Concave Fit Functions, 5 Users

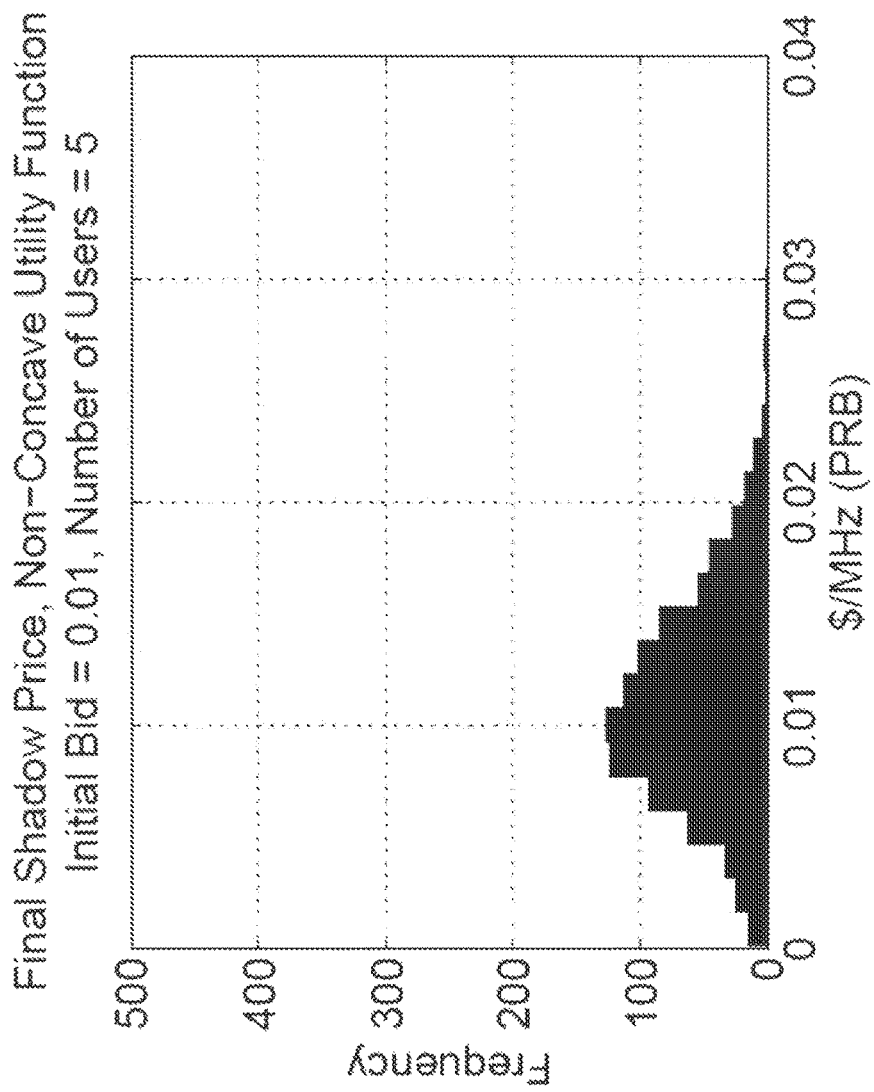
Figure 21: Shadow Prices for Non-Concave Utility Function, 5 Users

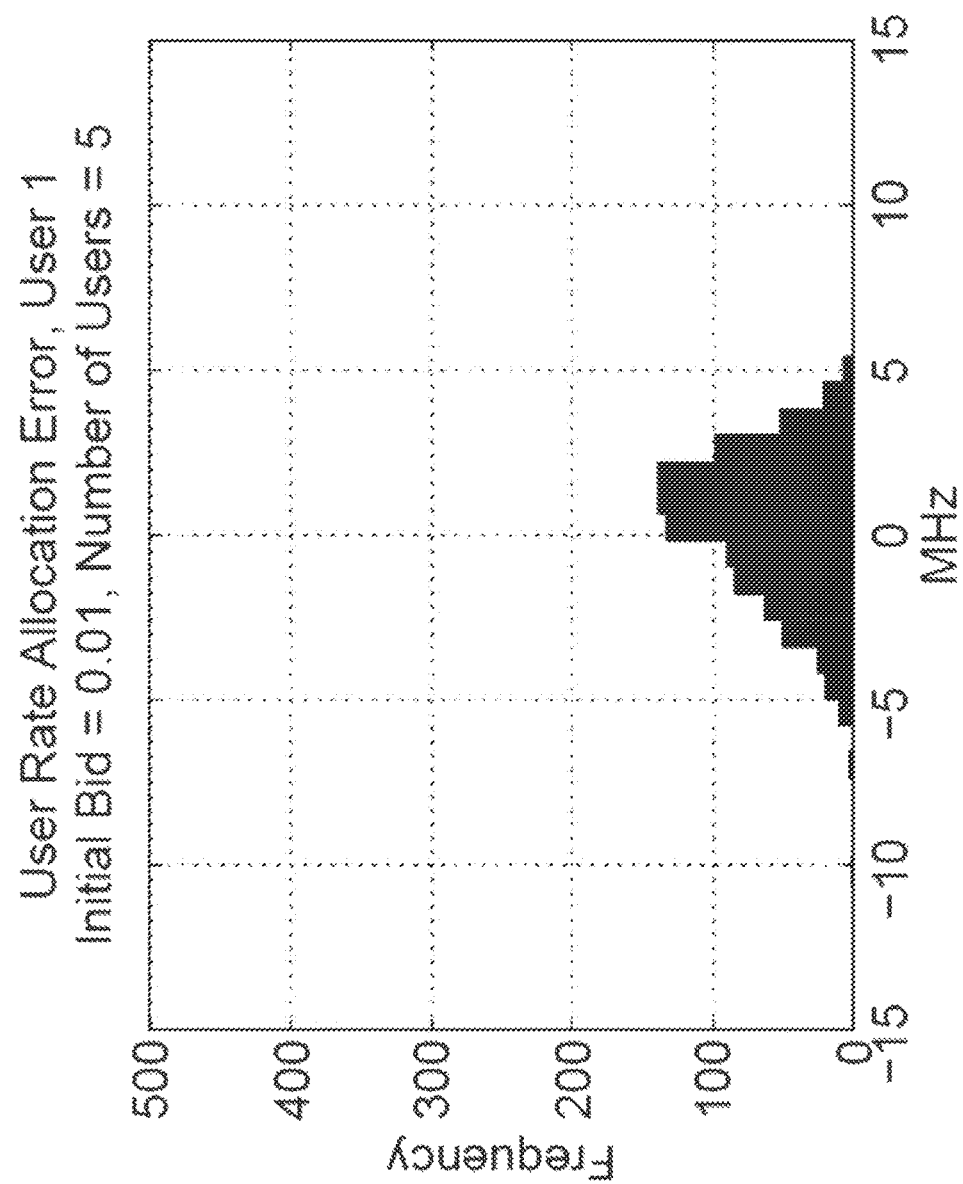
Figure 22: Example Resource Allocation Error, 5 Users (User 1)

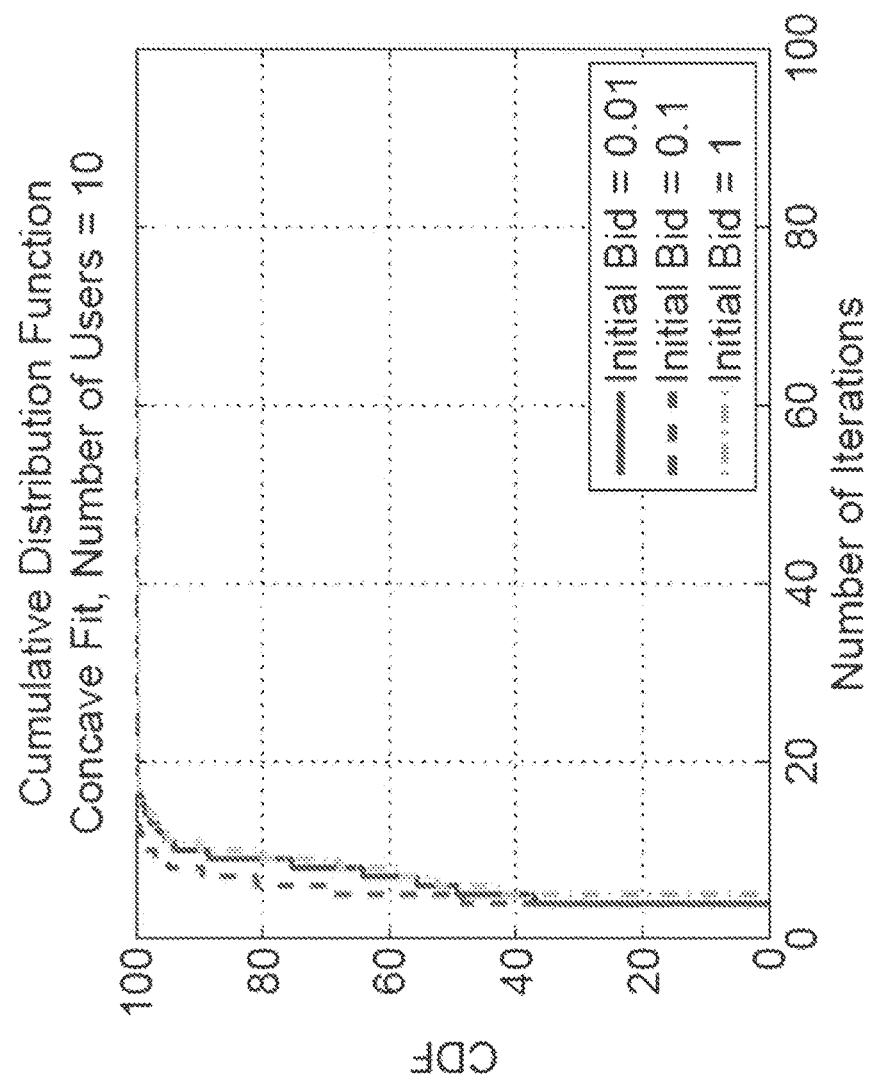
Figure 23: Concave Fit Convergence, 10 Users

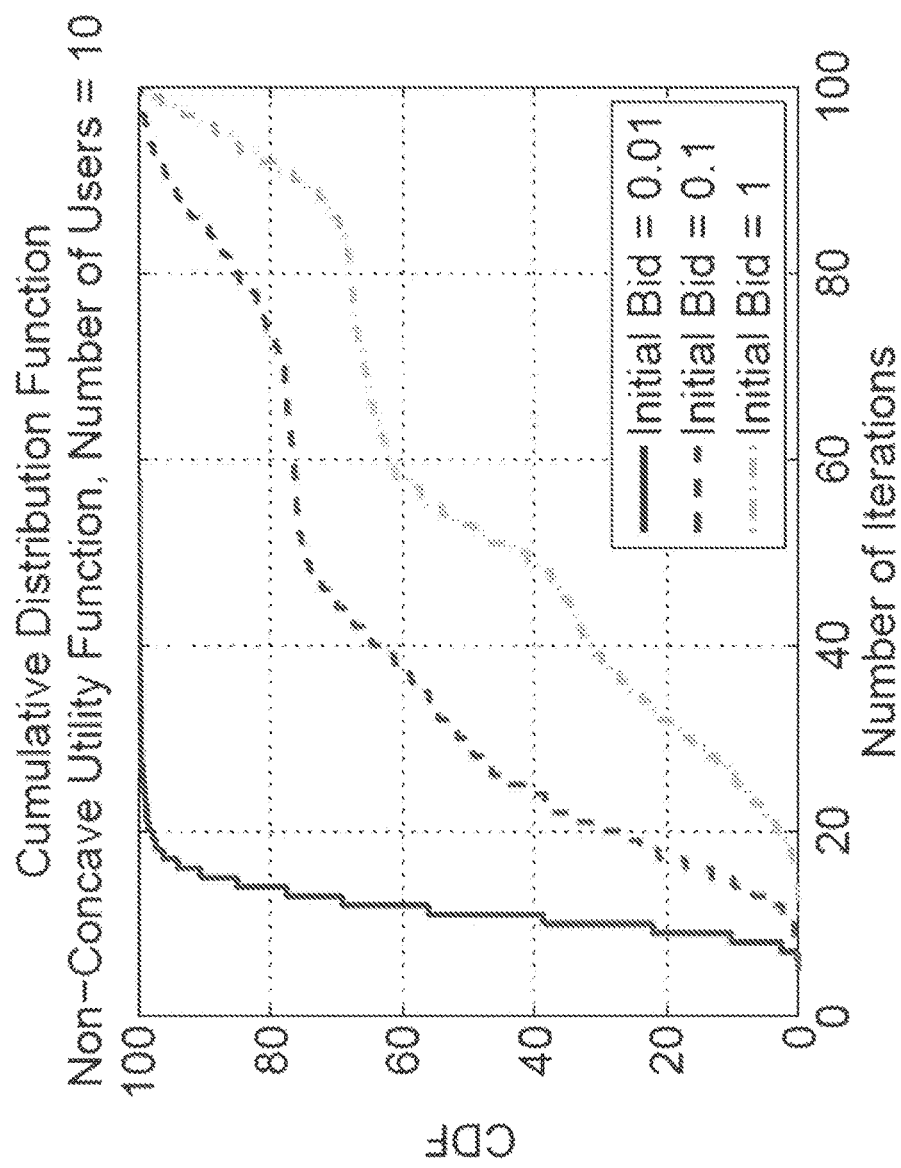
Figure 24: Non-Concave Utility Function Convergence, 10 Users

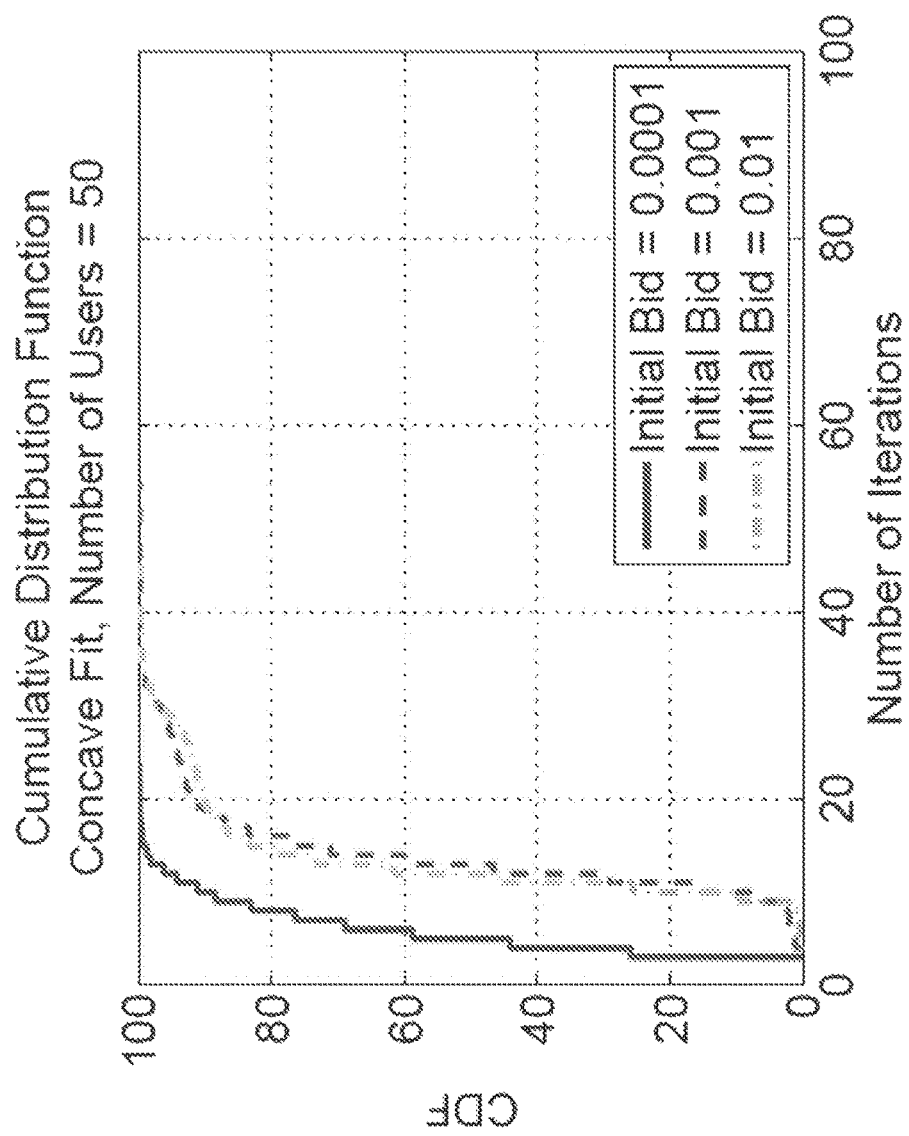
Figure 25: Concave Fit Convergence, 50 Users

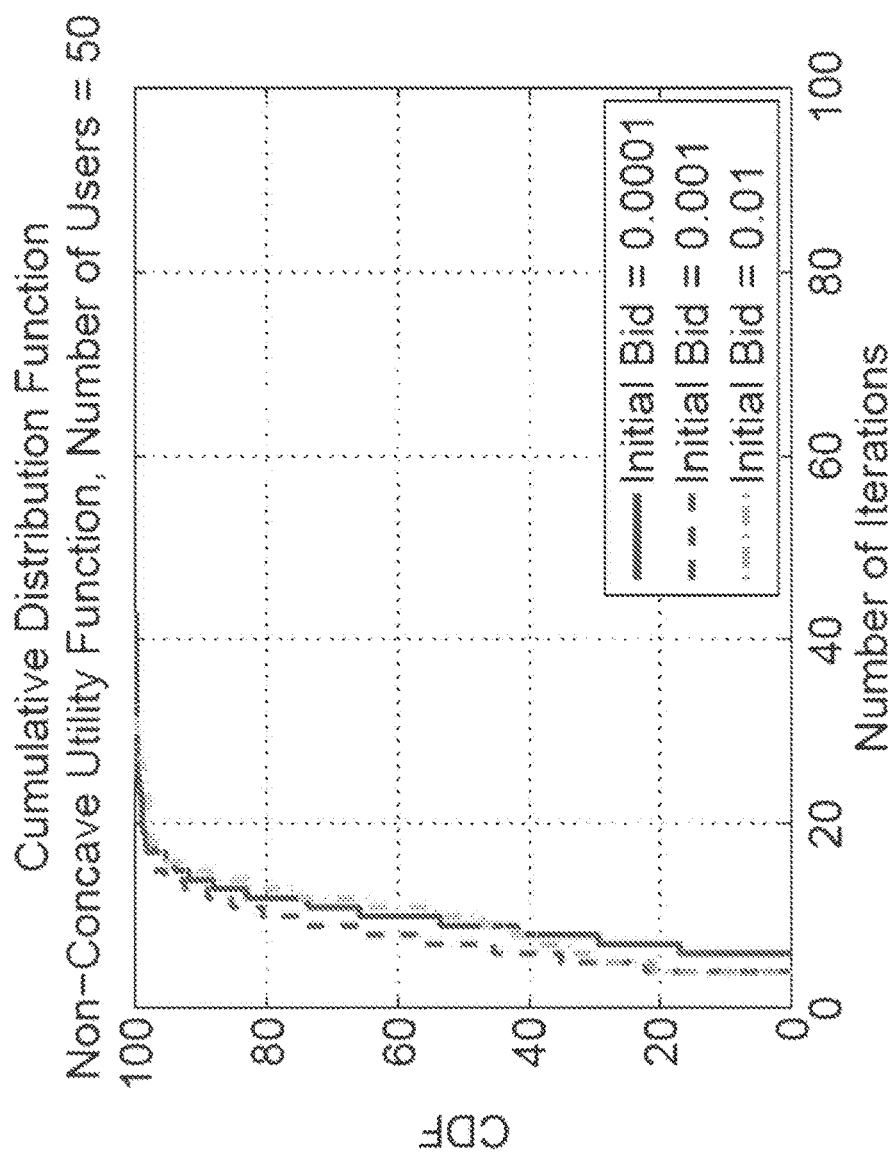
Figure 26: Non-Concave Utility Function Convergence, 50 Users

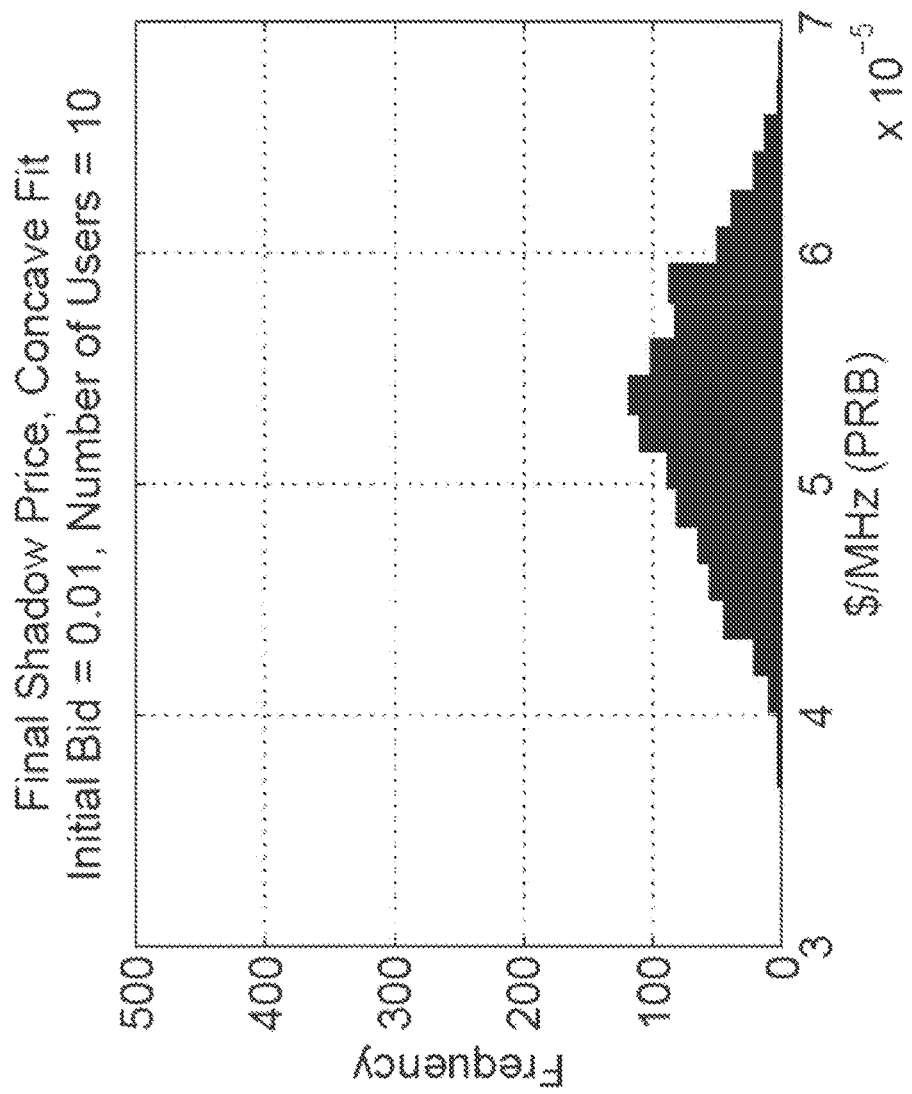
Figure 27: Shadow Price, Concave Fit Utility Function, 10 Users

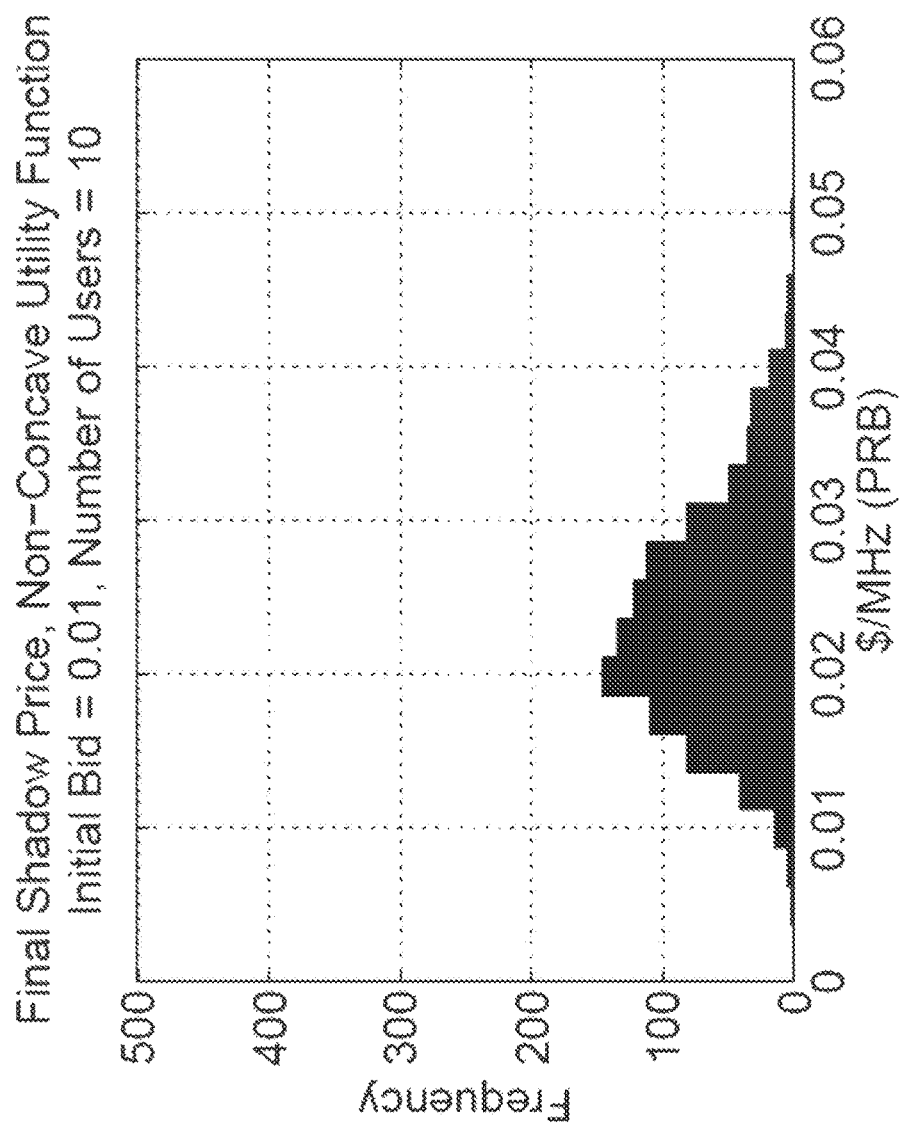
Figure 28: Shadow Price, Non-Concave Utility Function, 10 Users

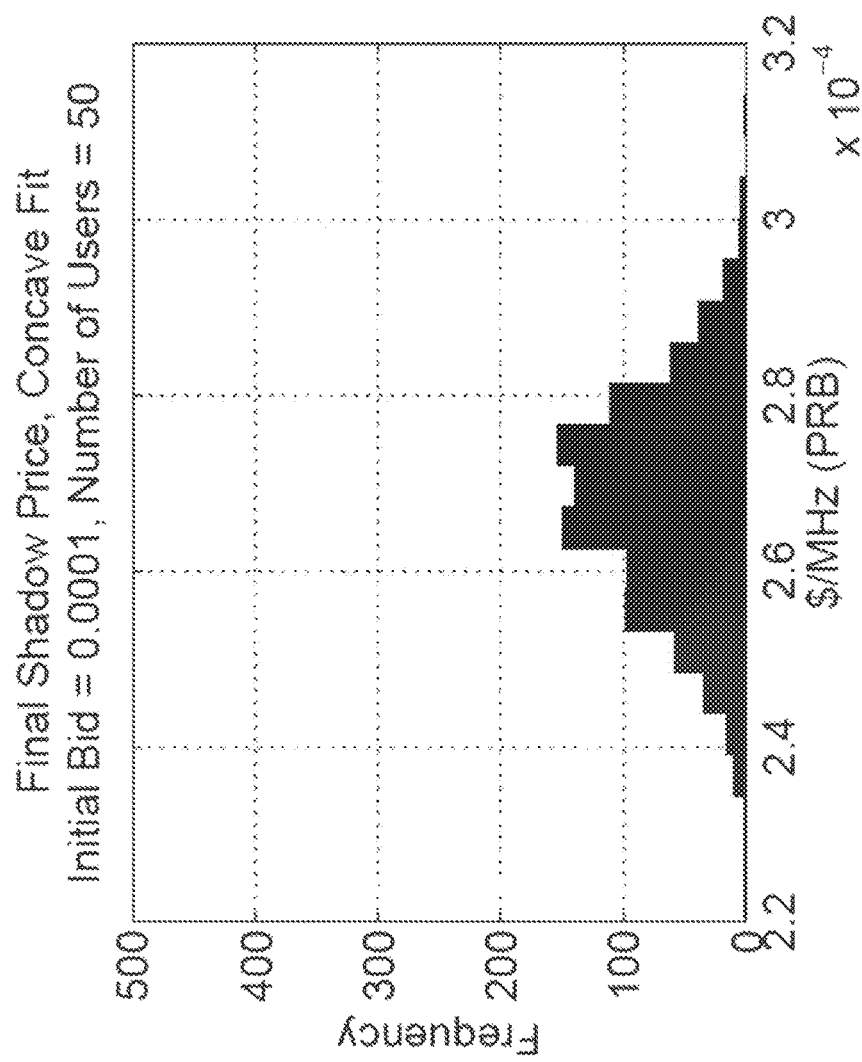
Figure 29: Shadow Price, Concave Fit Utility Function, 50 Users

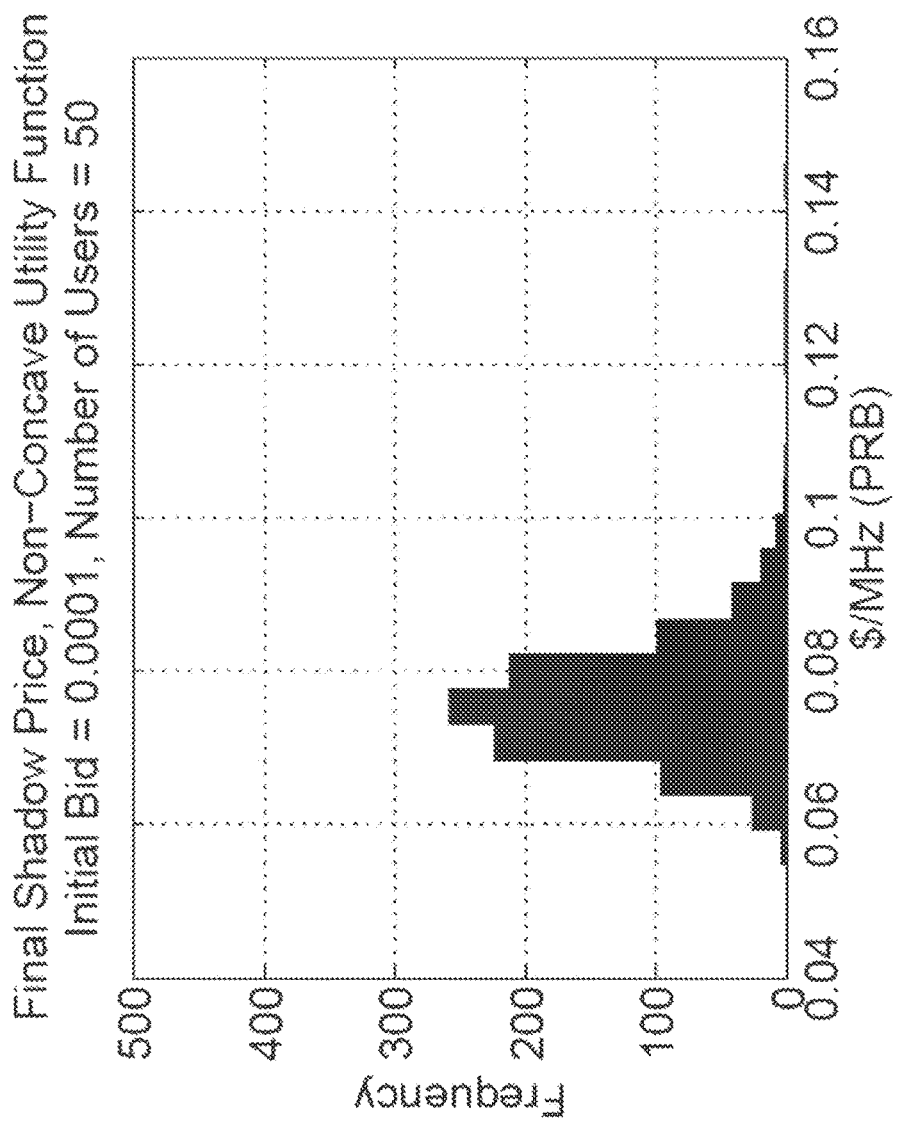
Figure 30: Shadow Price, Non-Concave Utility Function, 50 Users

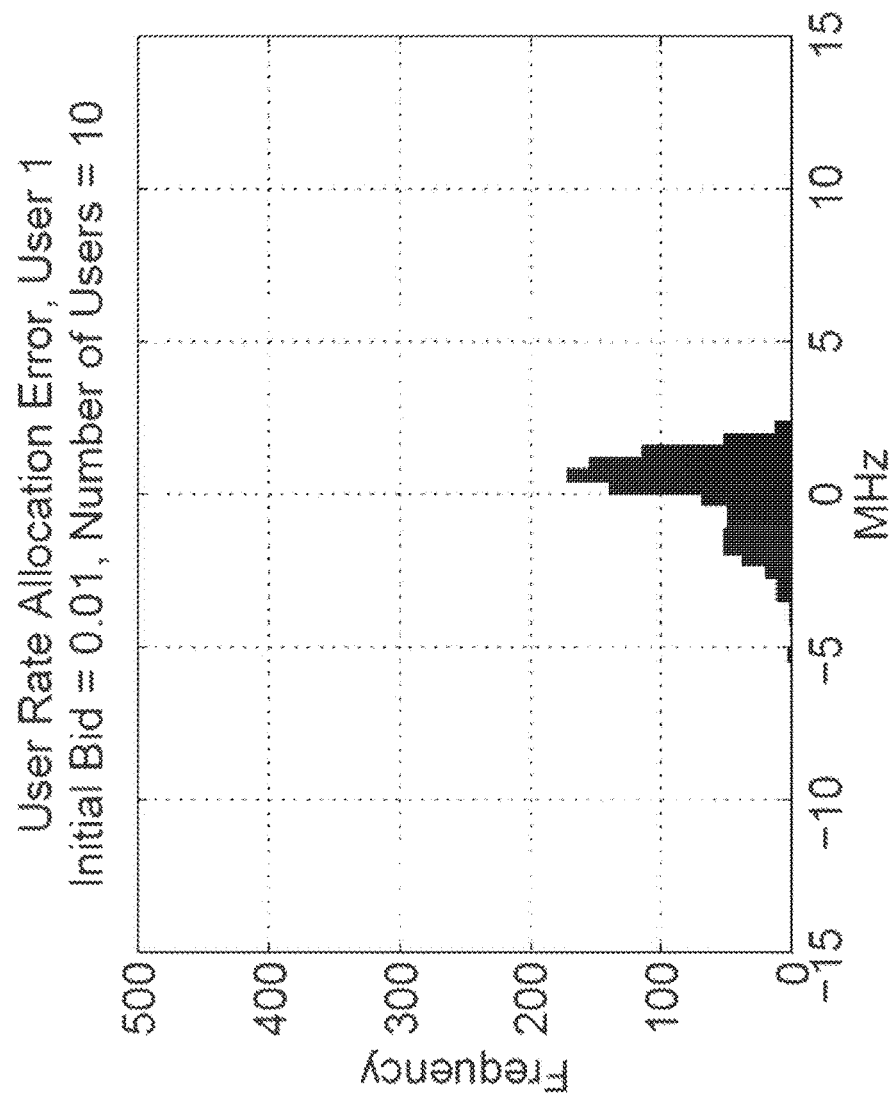
Figure 31: Rate Allocation Error Example, User 1, 10 Users Case

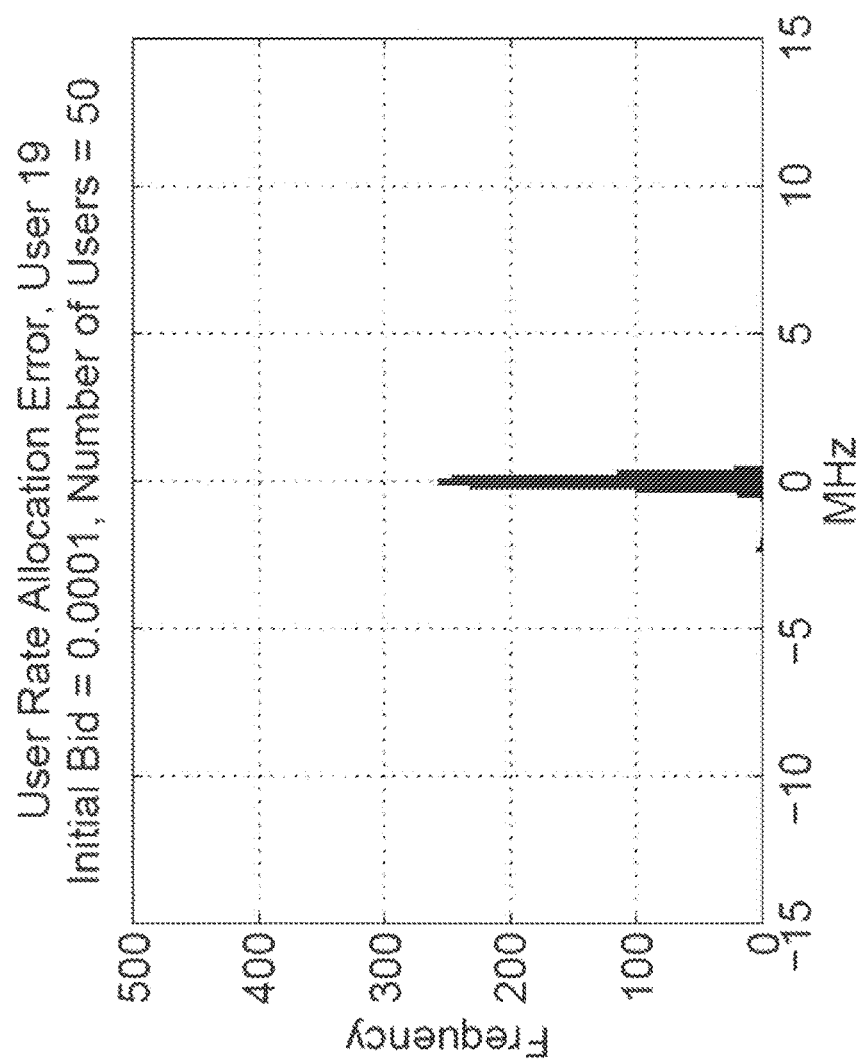
Figure 32: Rate Allocation Error Example, User 1, 50 Users Case

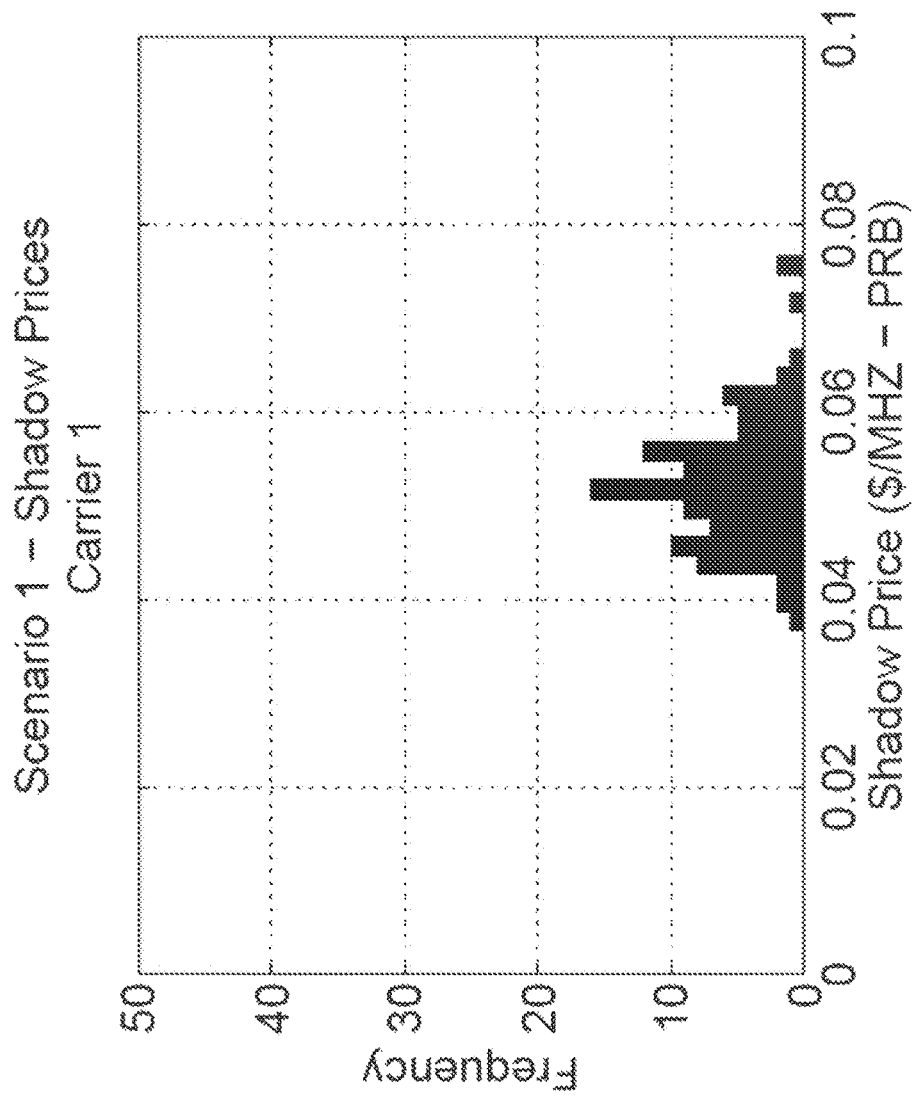
Figure 33: Shadow Price of Scenario 1, Carrier 1

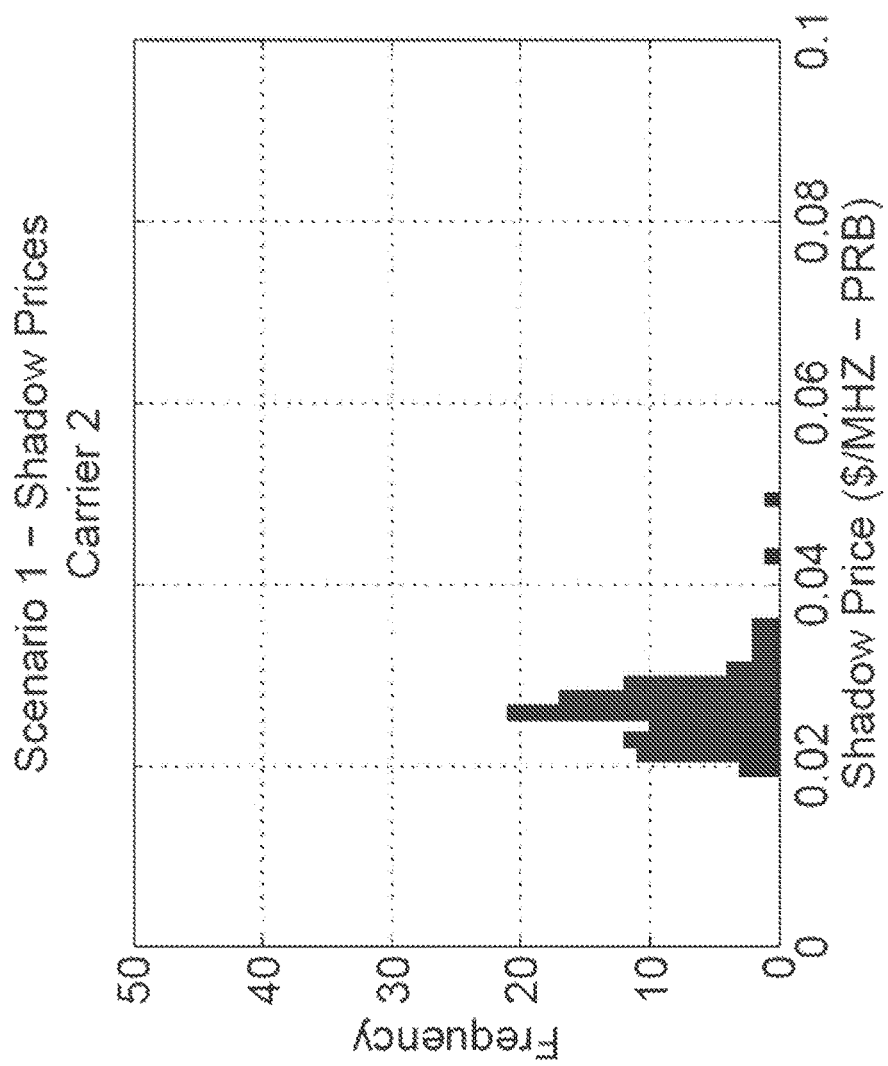
Figure 34: Shadow Price of Scenario 1, Carrier 2

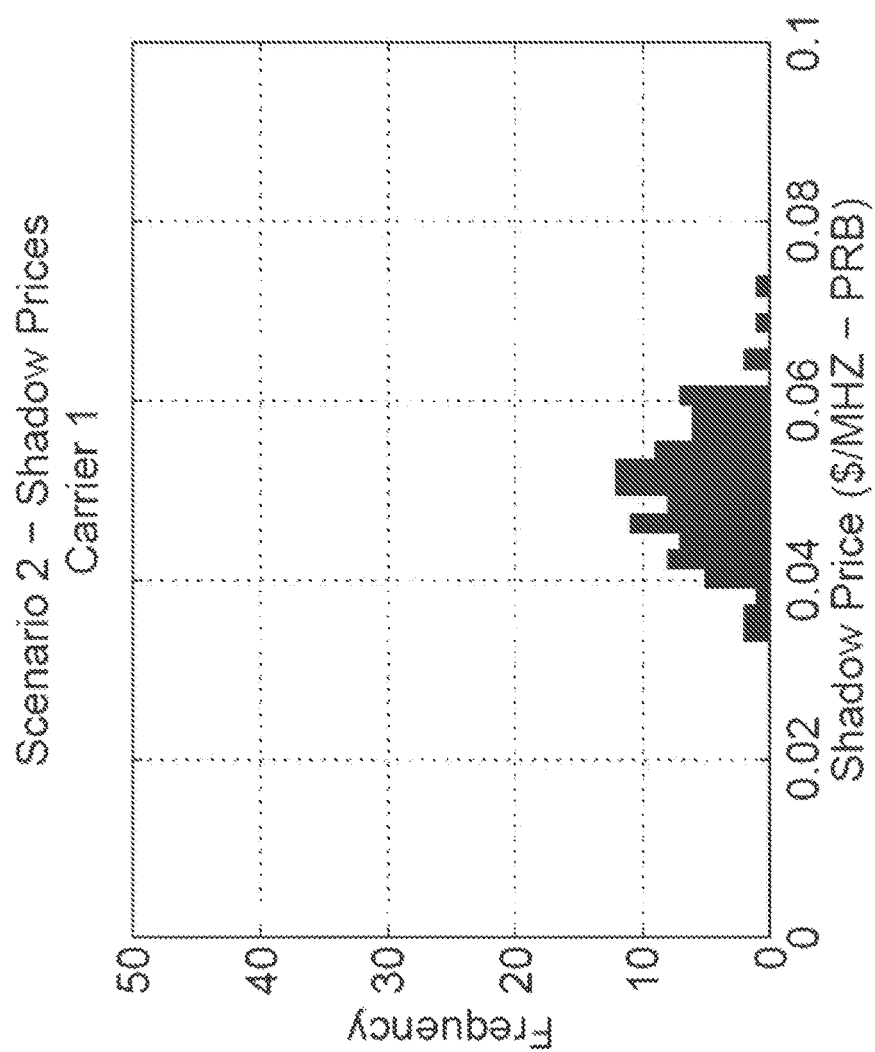
Figure 35: Shadow Price of Scenario 2, Carrier 1

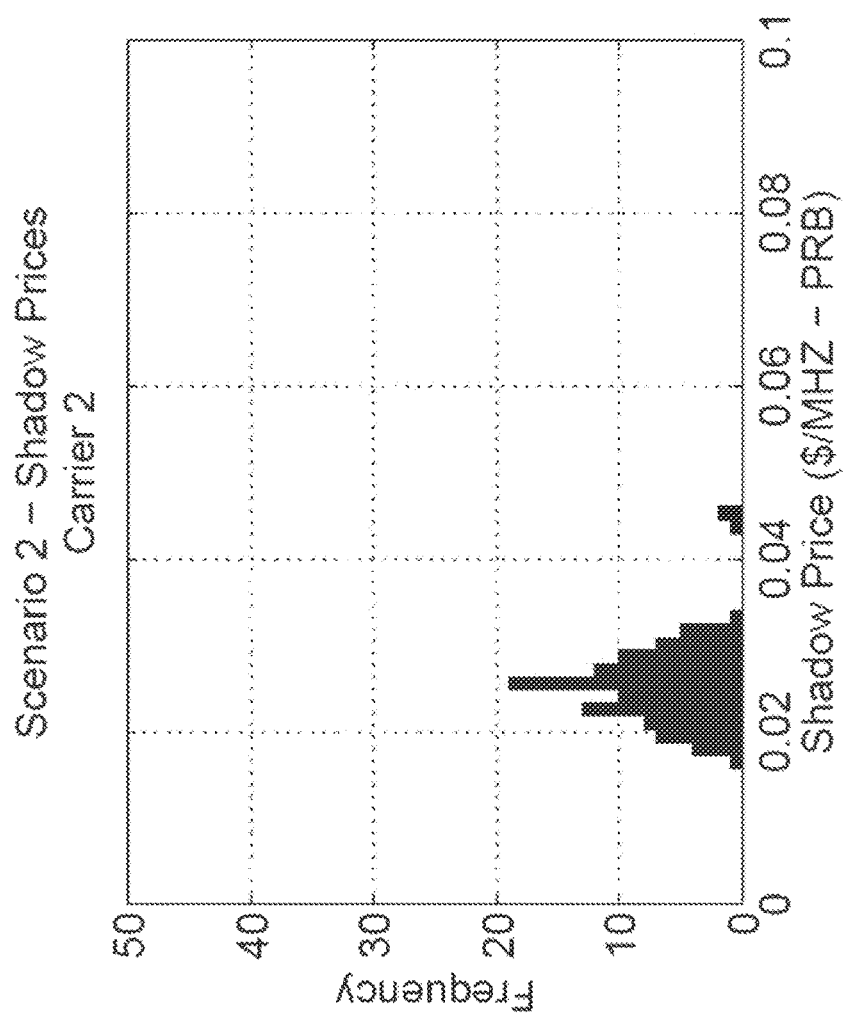
Figure 36: Shadow Price of Scenario 2, Carrier 2

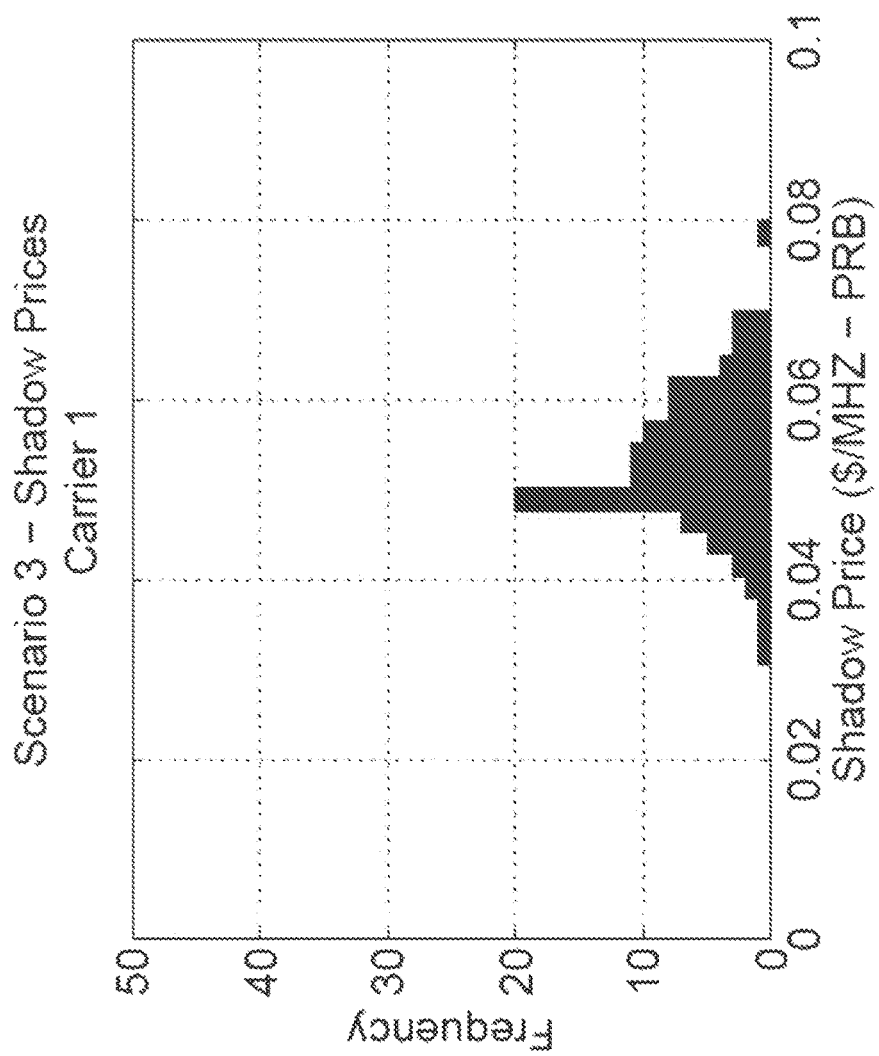
Figure 37: Shadow Price of Scenario 3, Carrier 1

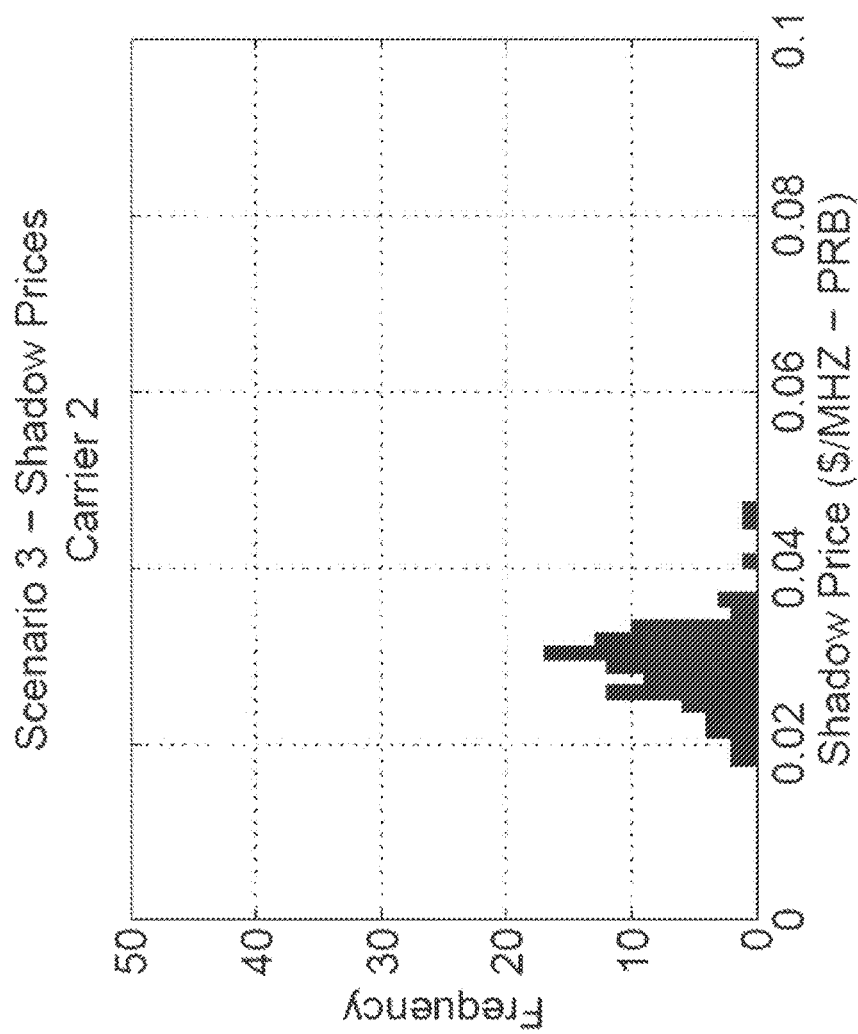
Figure 38: Shadow Price of Scenario 3, Carrier 2

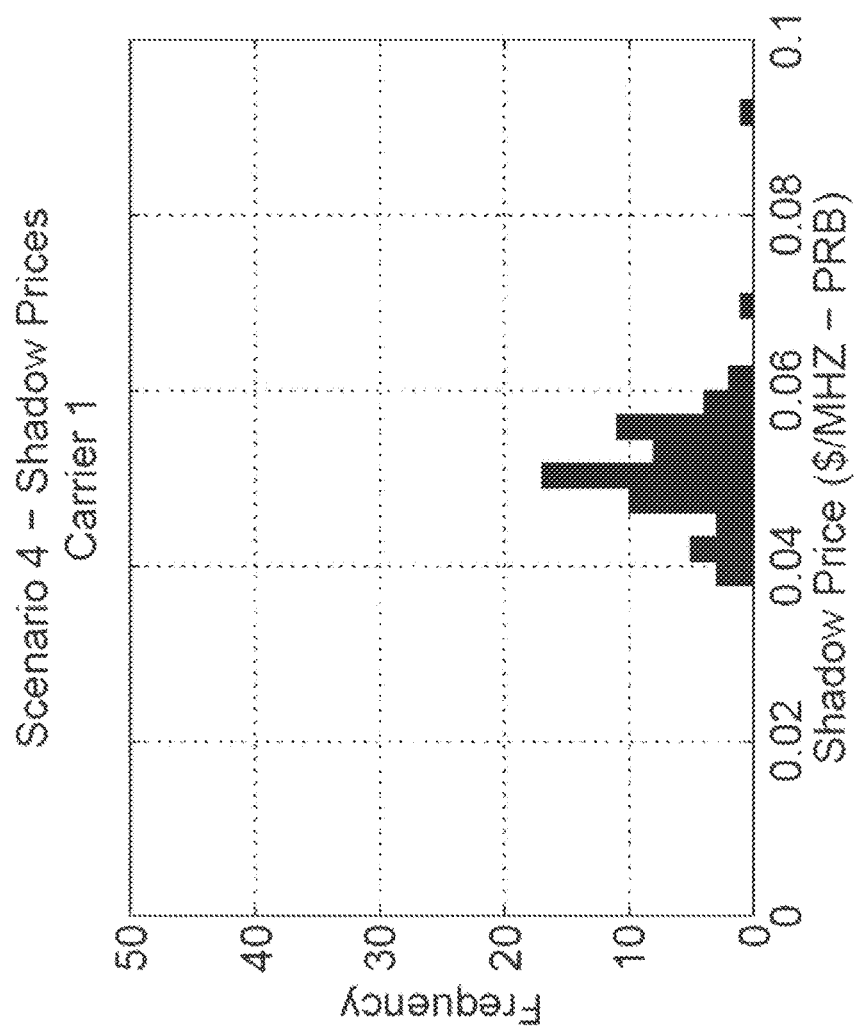
Figure 39: Shadow Price of Scenario 4, Carrier 1

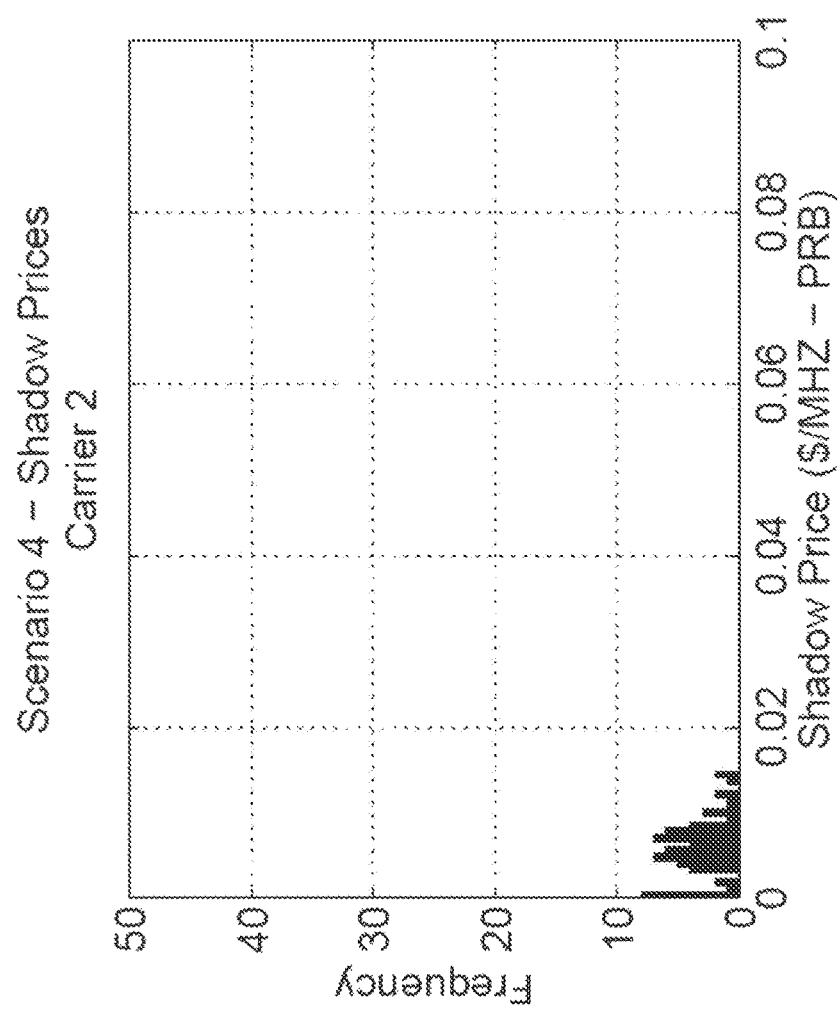
Figure 40: Shadow Price of Scenario 4, Carrier 2

METHOD AND SYSTEM FOR MULTIPLE CARRIER RESOURCE ALLOCATION IN LTE-ADVANCED NETWORKS

CROSS-REFERENCE TO RELATED APPLICATIONS

The present application is a continuation of U.S. application Ser. No. 15/854,113, entitled "Method and System For Multiple Carrier Resource Allocation in LTE-Advanced Networks," filed Dec. 26, 2017, which is a continuation of U.S. application Ser. No. 15/210,142, entitled "Method and System For Multiple Carrier Resource Allocation in LTE-Advanced Networks," filed Jul. 14, 2016 now issued as U.S. Pat. No. 9,854,475, which is a division of U.S. application Ser. No. 14/209,430, entitled "Method and System For Multiple Carrier Resource Allocation in LTE-Advanced Networks," filed Mar. 13, 2014 now issued as U.S. Pat. No. 9,414,216, which claims benefit of U.S. Provisional Patent Application Ser. No. 61/787,317, entitled "Method and System for Distributed Resource Allocation in LTE Networks Based on User Demand," filed Mar. 15, 2013, the contents of which are incorporated herein by reference in their entirety.

BACKGROUND OF THE EMBODIMENTS

Field of the Embodiments

The embodiments are directed to cellular carrier resource scheduling and pricing and its relation to carrier aggregation. More particularly, a novel algorithm is applied to account for varying user utility functions and revised cellular standards reflecting carrier aggregation capabilities.

Description of Related Art

As smart phones and mobile computing become more commonplace, the demand on cellular networks is on the rise. Given the limited frequency band available to cellular providers, this demand can exceed network capacity. Looking at the demand from the perspective of the user, smart phones have a large number of applications and most of them require network resources. In the current 3GPP 4G LTE standard, users are limited to one carrier. In instances where one carrier does not provide enough bandwidth for a given user, this user would experience a diminished Quality of Serve (QoS) with slower applications. A new feature of the 3GPP LTE-Advanced cellular standard that will work to solve these problems, from the perspective of the network and user, is carrier aggregation.

This new feature of 4G LTE-Advanced allows for multiple carriers to be used by a single user. The additional carriers per user will allow users to use their smart phones without a loss of QoS. Carrier aggregation also helps to lessen the load on the network. If a carrier outside the traditional cellular frequency band can be used, the stress on the traditional cellular band will diminish. Frequency bands that may allow for this type of on-demand carrier aggregation can be in the public service band, previously reserved military bands, or other non-traditional cellular bands.

The addition of carrier aggregation allows for higher data rates for users in addition to a lower demand on current cellular bands if non-traditional, on-demand bands are used for secondary carriers, but some outstanding technical implementation considerations remain. The issue of resource allocation and the determination of shadow prices across multiple carriers must be considered. The term shadow price can be defined as the network resource price resulting from a demand on the network in the form of user bids. This means the price of network resources, or Physical Resource Blocks (PRB), will be more expensive in the case where users demand more resources and less expensive in the case of less demand.

In addition to the complication of carrier aggregation when considering how to allocate resources and determine shadow prices, smart phones run various applications all with differing utility functions. The overall device utility function is the sum of the individual application utility functions. Since the device utility function will be a combination of inelastic and elastic application utility functions, it will have both inelastic and elastic regions. Traditional resource allocation algorithms used for cellular networks, like the Frank Kelly algorithm, assume that the user utility functions will be strictly elastic, or concave, functions (see F. P. Kelly, A. K. Maulloo, and D. K. H. Tan., "Rate control for communication networks: shadow prices, proportional fairness and stability," Journal of the Operational Research society, 49(3):237-252, 1998, which is incorporated herein by reference). This assumption allows for one unique optimal solution for each user's resource allocation. A more realistic resource allocation approach would be to consider a utility function that is representative of a prioritized sum of application utility functions. This type of utility function requires changes to the traditional methods of resource allocation, namely the Frank Kelly algorithm.

Previous work done for resource allocation is discussed herein. It is important to consider utility functions, costs to the users, and possible aggregation scenarios. In addition, previous work on resource allocation algorithms, including the Frank Kelly algorithm, provides a basis for the algorithms proposed herein.

When assigning resources to specific users, the network attempts to optimize the utility and cost across the network. Utility functions are unique to each user and depend on how the user is using the network resources. Traditionally, utility functions for cellular networks are assumed to be strictly concave. That is, there is diminishing return as a user is allocated more and more resources. This assumption allows for algorithms like the Frank Kelly algorithm to find unique resource allocation solutions through either iterative or algebraic solutions.

More generically, there are a few classes of utility functions that can be associated with different types of applications. The three types of utility functions are strictly inelastic utility functions, strictly elastic utility functions and a combination of the two functions where a minimum rate is required, but after that minimum rate, the utility function resembles the elastic utility functions. An illustration of these types of utility functions is seen in FIG. 1.

When considering smart phones comprised of many applications, one can group these applications into the three simple groups of utility functions considered in the previous paragraph. Applications like telephone calls can be placed in the strictly inelastic category. Each phone uses a particular codec that has a minimum data requirement to translate the voice over the network. No additional resources are used beyond this data rate because the amount of data required to send voice information over the network is static. This gives it the step function shape seen in FIG. 1(a).

Applications like email, social networking, and other applications that are not time critical can be placed in the strictly elastic utility function category. An email may be megabytes of data, but how long it takes to get to the user is not as critical. Obviously, a higher data rate gives the user a better QoS, but since the user is not notified until the email is in queue there is effectively no minimum data rate requirement. Therefore, any amount of resources from the network that can be dedicated to these resources is useful to these types of applications. An example of this "diminishing returns" model is seen in FIG. 1(b).

The last category of applications on a smart phone involves applications that resemble a combination of the inelastic and elastic utility functions. These applications consist of video streaming applications, such as YOUTUBE or time sensitive applications like SKYPE (including video calls). Video streaming specifically requires a minimum data rate for coarse resolution, so that the user can see what is on the screen. However, unlike voice calls, added data rate can increase the resolution of the video with diminishing return like the strictly elastic applications. This is because once the user is able to see what is on the screen, additional resolution only provides the video with greater detail. For example, instead of receiving a low quality video, the user may be able to make out details of the background in the streaming movie. This type of application may have a utility function like the one seen in FIG. 1(c).

Based on smart phones available today, a user can have multiple applications, each with different utility functions, running simultaneously on a single device. This complicates the traditional notion of a strictly concave utility function for cellular phone users. Later herein, consideration is taken on how to construct a user utility function from a combination of application utility functions prioritized based on what applications are most important to any given user. An example table of possible data rate requirements for certain applications is provided in Table 1.

TABLE 1

Data Rate Requirements for Common Applications

| Application | Minimum Data Rate | Maximum Data Rate |
| --- | --- | --- |
| Voice Calls | 16 kbps | 64 kbps |
| Emails | N/A | N/A |
| Video (SD/HD) | 2/6 Mbps | 4/8 Mbps |

Another important consideration when determining how to allocate resources is the cost functions for each user. There are some previously explored methods that select wireless networks solely based on cost to the user. The cost, in combination with the utility function for each user, is used to determine optimal resource allocation through algorithms like the Frank Kelly algorithm, discussed below. These cost functions must consider many factors. The first consideration is the price of the network resources themselves.

Each cellular provider or network sets a price for each resource block allocated to the user. This price structure can take many forms, but in most cases is assumed to be linear. That is, each resource block costs a constant dollar amount to the user. This is typically the only cost considered in the most simplistic solutions for resource block allocations across a network.

Another important element of the cost to the user is in the form of energy costs. Mobile devices work on battery power and require different amounts of power given the frequency band in which they are operating, whether they are on the fringes of the network or the main coverage area, etc. This means there is an additional energy cost for the amount of rate that is allocated to a user or the amount of time the user will be transmitting.

Other costs may include latency based on channel propagation properties and processing time. The evaluation of this cost is complex, since channel properties, frequency band of operation, user hardware, and base station hardware greatly change the cost of latency. This element of cost is considered negligent in the embodiments herein, but one skilled in the art recognizes that such may be incorporated to attain a more comprehensive model. The relevant costs and utility functions will be considered when allocating rate to the users based on maximizing the utility for each user and therefore across the network.

There are several different fairness models for rate allocation across a network as well as different algorithms for determining these rates. Two examples of fairness models include proportional fairness, and maxmin fairness. In addition to these fairness models, an optimal solution needs to be determined. These optimal solutions are typically referred to as Pareto optimal solutions. When considering how to determine Pareto optimal solutions, it is important to consider Pareto inefficient, Pareto efficient, and infeasible solutions. For the case of distributing solutions, infeasible solutions are those that require more resources than are available on the network. Pareto inefficient solutions are those solutions that do not allocate all network resources. Finally, Pareto optimal, or Pareto efficient, solutions are those solutions that distribute all of the network resources, which is also referred to as the Pareto front. Based on monotonically increasing utility functions, Pareto optimal solutions guarantee a maximization of the network utility. FIG. 2 represents the entire solution space including the Pareto inefficient solutions, Pareto optimal solutions, and infeasible solutions. For the present embodiments, it is considered that a network will want to distribute all of its resources in order to maximize the overall network utility.

Not all fairness models achieve Pareto optimal solutions, but can be used in conjunction with Pareto optimality to determine an overall fair and optimal solution of resource allocation. The first fairness model that is considered is maxmin fairness. This fairness models seeks to achieve the highest utility for users that have the lowest limits of utility. For example, this means that a user restricted to low channel capacity based on user equipment would have the utility function maximized. Equation (1) expresses the maxmin fairness model, where $U_i(r_i)$ is the utility function of a user i and $r_i$ is the rate allocated to that user. The use of maxmin fairness is rarely considered in the case of wireless networks and has limited use in the case of bottlenecks and other rate limitations. This fairness model is not used with the present embodiments, but is noted for its possible uses for maximizing current Release 8/9 capable devices in the presence of a growing number of Release 10 capable devices in the future.

$$r_i = \underset{r_i}{\mathrm{argmax}} \underset{i}{\min} U_i(r_i) \quad (1)$$

The second fairness model is proportional fairness. In this model, some rate must be allocated to every user. This is done through setting the condition of fairness to be a proportion, like the name suggests. This makes it impossible to set a users allocation to zero without setting the efficiency of the network to zero. Equation (2) represents the proportional fairness model, where $U_i(r_j)$ is the utility function of a user i and $r_i$ is the rate allocated to that user. Because this resource does not disenfranchise any given user, it will be considered as the appropriate fairness model for the present embodiments. This fairness model is the fairness basis for the Frank Kelly algorithm, which is modified in the present embodiments to allow for carrier aggregation.

$$r_i = \arg\max_{r_i} \prod_{i=1}^{n} U_i(r_i) \quad (2)$$

There are a few algorithms that can be used to achieve rate allocation with each fairness model. Two examples of these algorithms include the water-filling algorithm and the Frank Kelly algorithm. The water-filling algorithm can be simply explained as a method for equally distributing the resources and filling users to capacity. This algorithm does not necessarily maximize the utility across the network, since more utility may be gained by allocating more resources to a user with higher capacity. This algorithm uses the maxmin fairness model, since it works to maximize the utility for the user with a limit to the resources it is capable of using.

The second algorithm, which uses proportional fairness, is the Frank Kelly algorithm. This algorithm is an iterative process for determining rate allocation as well as the price the network should charge for given sets of resources. The iterative nature of the solution allows users to bid on resources until the allocated rate matches its optimally determined rate based on utility functions and cost.

In some instances, the price the network should charge for its resources is unknown as well. Since it is important for the user to maximize its utility less the cost of the network resources, knowledge of the shadow price is required. This is especially true in the case of carrier aggregation where demand of secondary carriers is a largely unknown. On-demand and opportunistic secondary carriers have never before been exercised as cellular carriers. Accordingly, there is a need in the art for a process to determine optimal rate allocation as well as network shadow price in view of the evolving primary and secondary carrier scenarios, i.e., carrier aggregation scenarios, and increasing cellular user demands.

SUMMARY OF THE EMBODIMENTS

In a first embodiment, a process for selecting an optimal individual user solution including an optimal rate allocation and associated price for a predetermined bandwidth of network resources includes: generating by a processor a utility function for the individual user, wherein the utility function represents a sum of multiple application utility functions; receiving by the processor data representative of costs associated with providing the predetermined bandwidth of network resources to the individual user; receiving by the processor an initial user bid for resource allocation from the individual user for the predetermined bandwidth of network resources and an initial network rate allocation; applying by the processor an iterative process to determine multiple possible user solutions, each possible user solution including a proposed user rate allocation and associated price, wherein the initial inputs to the iterative process include the initial user bid, the initial network rate allocation, the generated user utility function and the cost data; and further wherein the interactive process generates, based on the initial inputs, a shadow price for the predetermined bandwidth of network resources and multiple proposed user rate allocations with associated prices based on the generated shadow price; selecting by the processor the optimal individual user solution including an optimal rate allocation by comparing each of the multiple proposed user rate allocations with the initial network rate allocation for the user and selecting the closest multiple proposed user rate allocation to the initial network rate allocation.

In a second embodiment, a process for scheduling user rate allocation of a network where the network bandwidth of at least two cellular carriers is available for scheduling the user rate allocation comprising: aggregating by a processor the first network bandwidth of a first cellular carrier and the second network bandwidth of a second cellular carrier into a single network for the purposes of scheduling user rate allocation of the single network; ordering by the processor the first and second carriers within the single network such that there is a primary carrier and a secondary carrier; receiving by the processor an initial primary carrier user bid for resource allocation from a user for the bandwidth of the primary carrier and an initial primary carrier network rate allocation for the user; applying by the processor a first iterative process to determine multiple possible primary carrier user solutions, each possible primary carrier user solution including a proposed primary carrier user rate allocation and associated price, wherein the initial inputs to the iterative process include the initial primary carrier user bid, the initial primary carrier network rate allocation, a user utility function which represents a sum of multiple application utility functions, and primary carrier network cost data; generating by the first iterative process, based on the initial primary carrier inputs, a primary carrier shadow price for the bandwidth of the primary carrier and multiple proposed primary carrier user rate allocations with associated prices based on the generated primary carrier shadow price; selecting by the processor an optimal primary carrier user rate allocation by comparing each of the multiple proposed user rate allocations with the initial primary carrier network rate allocation for the user and selecting the closest multiple proposed primary carrier user rate allocation to the initial primary carrier network rate allocation; adjusting by the processor the user utility function to account for the optimal primary carrier user rate allocation; receiving by the processor an initial secondary carrier user bid from a user for the bandwidth of the secondary carrier and an initial secondary carrier network rate allocation for the user; applying by the processor a second iterative process to determine multiple possible secondary carrier user solutions, each possible secondary carrier user solution including a proposed secondary carrier user rate allocation and associated price, wherein the initial secondary carrier inputs to the iterative process include the initial secondary carrier user bid, the initial secondary carrier network rate allocation, the adjusted user utility function and secondary carrier network cost data; generating by the second iterative process, based on at least the initial secondary carrier inputs, a secondary carrier shadow price for the bandwidth of the secondary carrier and multiple proposed secondary carrier user rate allocations with associated prices based on the generated secondary carrier shadow price; and selecting by the processor an optimal secondary carrier user rate allocation by comparing each of the multiple proposed secondary carrier user rate allocations with the initial secondary carrier network rate allocation for the user and selecting the closest multiple proposed secondary carrier user rate allocation to the initial secondary carrier network rate allocation.

BRIEF DESCRIPTION OF THE FIGURES

The preferred embodiments of the present invention are illustrated by way of example and not limited to the following figures:

FIG. 1 illustrates exemplary utility functions applicable for categorizing smart phone functions and applications;

FIG. 2 illustrates the solution space including the Pareto inefficient solutions, Pareto optimal solutions, and infeasible solutions for determining optimal solution for rate allocation;

FIG. 3 illustrates US frequency spectrum allocation table;

FIG. 4 illustrates carrier aggregation scenarios in frequency;

FIG. 5 illustrates exemplary uplink and downlink scenarios for primary and secondary carriers;

FIG. 6 illustrates exemplary base station scenarios (1) to (4) with primary and secondary carrier relationships;

FIG. 7 illustrates exemplary user equipment implementations based on component carrier (CC);

FIG. 8 illustrates an exemplary round robin packet scheduling methodology across N carriers;

FIG. 9 is a schematic showing edge versus core users;

FIG. 10 illustrates exemplary user grouping and carrier aggregation scenario;

FIG. 11 illustrates exemplary application utility functions;

FIG. 12 illustrates exemplary total utility function in accordance with embodiments described herein;

FIG. 13 illustrates exemplary marginal utility concept in accordance with embodiments described herein;

FIG. 14 illustrates an exemplary MATLAB Scenario 1 for base station configuration shown in FIG. 6(1) in accordance with embodiments described herein;

FIG. 15 illustrates an exemplary MATLAB Scenario 2 for base station configuration shown in FIG. 6(2) in accordance with embodiments described herein;

FIG. 16 illustrates an exemplary MATLAB Scenario 3 for base station configuration shown in FIG. 6(3) in accordance with embodiments described herein;

FIG. 17 illustrates an exemplary MATLAB Scenario 4 for base station configuration shown in FIG. 6(4) in accordance with embodiments described herein;

FIG. 18 illustrates an exemplary concave fit utility function convergence, 5 Users, in accordance with embodiments described herein;

FIG. 19 illustrates an exemplary non-concave fit utility function convergence, 5 Users, in accordance with embodiments described herein;

FIG. 20 illustrates exemplary shadow prices for concave fit functions, 5 Users, in accordance with embodiments described herein;

FIG. 21 illustrates exemplary shadow prices for non-concave fit functions, 5 Users, in accordance with embodiments described herein;

FIG. 22 illustrates exemplary resource allocation error, 5 Users (User 1), in accordance with embodiments described herein;

FIG. 23 illustrates an exemplary concave fit utility function convergence, 10 Users, in accordance with embodiments described herein;

FIG. 24 illustrates an exemplary non-concave fit utility function convergence, 10 Users, in accordance with embodiments described herein;

FIG. 25 illustrates an exemplary concave fit utility function convergence, 50 Users, in accordance with embodiments described herein;

FIG. 26 illustrates an exemplary non-concave fit utility function convergence, 50 Users, in accordance with embodiments described herein;

FIG. 27 illustrates exemplary shadow prices for concave fit functions, 10 Users, in accordance with embodiments described herein;

FIG. 28 illustrates exemplary shadow prices for non-concave fit functions, 10 Users, in accordance with embodiments described herein;

FIG. 29 illustrates exemplary shadow prices for concave fit functions, 50 Users, in accordance with embodiments described herein;

FIG. 30 illustrates exemplary shadow prices for non-concave fit functions, 50 Users, in accordance with embodiments described herein;

FIG. 31 illustrates exemplary resource allocation error, 10 Users (User 1), in accordance with embodiments described herein;

FIG. 32 illustrates exemplary resource allocation error, 50 Users (User 1), in accordance with embodiments described herein;

FIG. 33 illustrates exemplary shadow price of Scenario 1, Carrier 1 for base station configuration shown in FIG. 6(1) in accordance with embodiments described herein;

FIG. 34 illustrates exemplary shadow price of Scenario 1, Carrier 2 for base station configuration shown in FIG. 6(1) in accordance with embodiments described herein;

FIG. 35 illustrates exemplary shadow price of Scenario 2, Carrier 1 for base station configuration shown in FIG. 6(2) in accordance with embodiments described herein;

FIG. 36 illustrates exemplary shadow price of Scenario 2, Carrier 2 for base station configuration shown in FIG. 6(2) in accordance with embodiments described herein;

FIG. 37 illustrates exemplary shadow price of Scenario 3, Carrier 1 for base station configuration shown in FIG. 6(3) in accordance with embodiments described herein;

FIG. 38 illustrates exemplary shadow price of Scenario 3, Carrier 2 for base station configuration shown in FIG. 6(3) in accordance with embodiments described herein;

FIG. 39 illustrates exemplary shadow price of Scenario 4, Carrier 1 for base station configuration shown in FIG. 6(4) in accordance with embodiments described herein; and FIG. 40 illustrates exemplary shadow price of Scenario 4, Carrier 2 for base station configuration shown in FIG. 6(4) in accordance with embodiments described herein

DETAILED DESCRIPTION

The Frank Kelly algorithm has been used to determine the optimal rate allocation as well as the network shadow price. As defined previously, the network shadow price is determined by the demand for network resources.

In the case of cellular networks, it may make sense in implementation to keep a reserve amount of resources to deal with network overhead associated with coordinating other users, handover, or other overhead costs. For the examples provided herein, it is assumed that the total number of resources used in the allocation are below the prescribed reserve required to complete handover, start new connections, and any additional network overhead.

The Frank Kelly algorithm is an iterative solution for achieving Pareto optimal resource allocation across the network keeping in mind proportional fairness. This means the Frank Kelly algorithm seeks to distribute all network resources keeping in mind not to disable any users.

In operation, the Frank Kelly algorithm begins with initial bids from each of the users for what each user would pay for network resources. These initial bids are transmitted to the network controller and an initial shadow price is set to be the sum of all user bids over the total rate allocation available. The network then allocates network resources based on the ratio of a given users bid to the shadow price determined on the network. These allocations are sent to the user. This starts the iterative process of the user adjusting the bid in order to achieve a maximum of the derivative less the shadow price of the network resources. The algorithm is reflected in the following pseudo-code. In the pseudo-code, $w_i$ is the bid of user i, p is the network shadow price, and R is the total rate available on the network. The sum of the bids for n users is represented in $\Sigma_{j=1}^{n} w_j$ and is used to determine the network shadow price as well as the rate allocated, $r_i$, for a user i. Each user, i, also determines the optimal rate, $r_{i,opt}$ from the network shadow price, p, and its individual utility function, $U_i(r_i)$. In the construct of this algorithm, no user is required to have knowledge of available network resources. Each user merely bids based on the amount of network resources is desired.

$w_i$ = initial bid of user $i$ $$p = \frac{\sum_{i=1}^{n} w_i}{R}$$

$$r_i = \frac{w_i}{p} = \frac{w_i}{\sum_{j=1}^{n} w_j} R$$

$r_{i,opt} = \mathrm{argmax}[U_i(r_i) - r_i p]$ $U_i'(r_{i,opt}) = p$ while $r_i \neq r_{i,opt}$ do $w_i = r_{i,opt} p$ $$p = \frac{\sum_{i=1}^{n} w_i}{R}$$

$$r_i = \frac{w_i}{p} = \frac{w_i}{\sum_{j=1}^{n} w_j} R$$

$\max[U_i(r_i) - r_i p]$ $U_i'(r_{i,opt}) = p$ end while

This algorithm requires reasonable starting bids in order to converge in a short amount of time as perceived by the users on the network. Further, the Frank Kelly algorithm is intended for use with elastic utility functions. This is an important caveat to its application to the carrier aggregation scenarios discussed herein and contemplated by the updated cellular standards.

Another assumption made in the above instantiation of the Frank Kelly algorithm is the assumption that the cost is a strictly linear function. This linear representation is seen in the cost term, $r_i p$, where $r_i$ is the rate allocated to user i, and p is the shadow price per unit of network resource. Costs are more complicated than a simple linear cost of network resources. These include step function-like costs for energy consumption and unknown latency costs.

For the purposes of the embodiments described herein, the cost is still assumed to be the linear and represents only the network resource cost. In terms of derivatives, the step function has a derivative of a delta function at the initial point of an allocated rate of zero. In the above construct of the Frank Kelly algorithm, this would have no bearing on the rate allocated (derivatives are used to find solutions). As mentioned earlier, logic could be added to check if the amount of utility exceeds the cost of turning on the additional RF chain required for a secondary carrier in the mobile device as well as the network price in order to achieve a rate allocation. Latency costs can be addressed by adjusting the resource block allocation to the information the device is capable of sending over the network given the amount of resources allocated to it by the network.

A simple example of the Frank Kelly algorithm can be explained in the case of only two users with different diminishing returns models for utility. In this case, take the simple case of scaling the natural logarithm to create each user's utility function. Equations (3)-(4) represent the user utility functions, where $U_1(r)$ and $U_2(r)$ are the utility functions for users 1 and 2, respectively. The initial bid in this example is equal for each user. Equal bids are a valid starting condition given each user will not have knowledge of other users utility functions and will base its bid on expected demand on the network. For this example, say the initial bids are each 1 for a total amount of resources of 20 MHz.

$$U_1(r) = \frac{1}{2}\ln(r) \qquad (3)$$

$$U_2(r) = 2\ln(r) \qquad (4)$$

By the construct of the Frank Kelly algorithm, the shadow price determined by the network will be 0.1/MHz. Based on the equal bids, each user is allocated half of the resources, or 10 MHz. Then each user determines its ideal rate allocation based on the network resource shadow price. Given the utility functions, the ideal rate allocations are determined to be 5 MHz and 20 MHz for users 1 and 2, respectively. Since these ideal rate allocations do not match what each user was actually allocated, the users adjust their bids accordingly. The bids are adjusted to be 0.5 and 2 for users 1 and 2, respectively. The next iteration by the network provides a resource allocation of 4 MHz and 16 MHz, which matches the fact that one user gains four times the utility of the second user. The shadow price is thus determined to be 0.125/MHz and the users determine their ideal rate allocation to be 4 MHz and 16 MHz, which matches that allocated by the network. A network solution has been achieved and the iterations cease. With more users and varying utility functions, the amount of time to converge can be expected to increase. The case of multiple solutions per user will also affect convergence time.

Later, a modified version of the Frank Kelly algorithm is detailed. This modified version of the Frank Kelly algorithm attempts to allow an arbitrary utility function to be used as long as portions of the utility function are concave. This allows a more representative smart phone utility function to be used when determining resource allocation across the network.

In the 3GPP 4G LTE-Advanced standard, a new feature was added in Release 10 that allows for single users to employ multiple carriers in order to achieve a higher combined bandwidth. This feature was required for a few reasons. One reason is that smart phones require large bandwidth allocations. Smart phones have an increasing number of applications that can run simultaneously on any given phone. This means the users are eventually limited by the carrier bandwidths provided by the network. Another reason for this added feature is the fact that the current frequency spectrum is highly segmented and large contiguous bandwidths are not readily available for use within the current cellular bands. The current frequency allocation table for the US can be seen in FIG. 3. The many colors squeezed into every inch of frequency space give an idea of how segmented the frequency spectrum is currently.

By adding the feature of carrier aggregation to Release 10 of the 3GPP standard, users can now achieve their required bandwidths through the use of resources on multiple carriers. This can be done through carriers within the current reserved band used by cellular providers or by using on-demand carriers on bands like the public radio band or previously reserved military bands. These previously reserved bands open up possibilities for higher spectrum efficiency, since traditionally these bands are used for small amounts of time and are empty for large portions of time. By allowing users to access these bands through on-demand scheduling, the traffic load on the traditional cellular band, which is ever increasing, can be lessened.

The different instantiations of carrier aggregation can be summed up in three large categories. These categories are intraband contiguous, intraband non-contiguous, and interband non-contiguous carrier aggregation. These scenarios are illustrated in FIG. 4. The interband, contiguous scenario is not represented in the graphic, since this scenario can be represented by the intraband, contiguous scenario with different frequency band labels on the carriers.

More specifically, intraband contiguous carrier aggregation refers to the situation where all carriers used by a single user on the uplink or the downlink are adjacent to each other in frequency. This means that effectively carrier aggregation is creating a large bandwidth within the traditional cellular band through a combination of smaller carriers. This category of operation is unlikely given the segmented nature of the frequency spectrum as illustrated previously, but would be simplistic from a user hardware implementation perspective, since a single RF chain may be able to achieve this type of carrier aggregation.

Intraband, non-contiguous carrier aggregation is described as carrier aggregation where the combined carriers fall within the same band, assumed to be the traditional reserved cellular band, but are not adjacent in frequency. This is a more realistic scenario, since the frequency band tends to be greatly segmented. Like the previous scenario, the user hardware implementation could simply be achieved through a single RF chain since the carriers are within the same band.

The final category of carrier aggregation is interband, non-contiguous aggregation. The non-contiguous nature of this category of carrier aggregation is implied by the fact that the two carriers are within different bands. This type of carrier aggregation allows the user the most flexibility and frequency band opportunity. However, the user hardware implementations are probably the most complex since the limits of a single RF chain are typically a single band of interest for practical reasons. The complexities of user hardware implementations are discussed later.

The size of the carriers match Release 8 and 9 carrier sizes and can vary from 1.4 MHz-20 MHz. Theoretically these carriers can be grouped together and used for carrier aggregation in any variation of ways. The maximum aggregated bandwidth is currently 100 MHz, which means up to five carriers can be aggregated, each carrier at 20 MHz. The carriers are limited to carrier sizes in Release 8/9 of the 3GPP standard because the addition of carrier aggregation still requires the network to be backwards compatible with network devices compatible with Release 8/9. In other words, the addition of carrier aggregation is transparent to users not taking advantage of the new feature. This means when considering how to allocate resources, all users, both those taking advantage of carrier aggregation and those not taking advantage of carrier aggregation, must be considered. Some resource allocation or packet scheduling algorithms seek to group these users and will be discussed later.

An important aspect of carrier aggregation is the coordination between carriers on a single mobile user handset. In Release 10, the coordination is specified such that the uplink and downlink carriers are comprised of a primary carrier and multiple secondary carriers. All scheduling of data packets for primary and secondary carriers is done through the primary carrier. In the current implementations, the primary carrier is always established and scheduled before the secondary carrier. Practically, this makes sense given the primary carriers will be available to users effectively all the time, while secondary carriers may have intermittent service. These procedures for scheduling handle the intermittent and on-demand type of service for the secondary carriers rescheduling lost or overly delayed packets on carrier one if the need arises. The illustration of an example with primary and secondary carriers on the uplink and downlink is displayed in FIG. 5.

It is important to note that an asymmetry can arise between uplink and downlink carriers and that carriers on the downlink are not necessarily associated with a given uplink carrier. The asymmetry allows for higher downlink data rates where required and maintains efficiency on the network where higher data rates are not required. In Release 10, asymmetric carrier aggregation only exists where the number of carriers is larger for downlink traffic. This is because of the nature of downlink and uplink traffic. For example, a user may require lower data rates to send emails and social media posts on the uplink, but may require higher data rates to download and stream videos on the downlink.

In carrier aggregation, the traffic can either be divided in frequency, or Frequency Division Duplex (FDD), or divided in time, Time Division Duplex (TDD). The choice between these is network and demand dependent, but carriers have subcarriers or resource blocks in frequency, so the implementation of either scheme is supported by the construct of the 3GPP standard.

In addition to user hardware implementation issues, which will be discussed at the end of this chapter, there are many different base station implementation scenarios. These different scenarios change the network resource block allocations and effectively the price of the network resources themselves. The focus of the present embodiments will be the resource allocation in carrier aggregation scenarios similar to those detailed in the following section.

As mentioned in the previous section, there are several base station scenarios that require consideration when determining the methods of resource allocation in relation to carrier aggregation. The four scenarios that should be considered are depicted in FIG. 6, which shows the basic concepts of each scenario. This section aims to go into each scenario in depth and consider the implications to resource allocation. It should be noted that the utility functions for each scenario and each carrier will not change. From the perspective of the user, it does not matter which carrier provides the network resources, the utility is the same. The method to dealing with utility functions across multiple carriers will be discussed in the following section. What will change for each base station scenario is the cost of network resources.

For all the scenarios, the solid line ovals represent the primary carrier, which is representative of a current cellular base station carrier within a common cellular frequency band. This carrier, as explained in the previous section, is used to send signalling and scheduling information for all carriers on the network. The dashed line ovals represent the secondary carrier. This carrier implementation has different scenarios illustrated in FIG. 6 and covers all of the carrier aggregation base station scenarios.

The first scenario in FIG. 6(1) shows the simplest case of carrier aggregation. In this case the two carrier coverage areas are identical. This points to the two carriers being serviced by the same base station antenna and being almost adjacent in frequency band, given the identical, or nearly identical, physical coverage patterns. In this case, the scenario can be associated with intraband, contiguous carrier aggregation, or intraband, non-contiguous carrier aggregation. Since the coverage of the carriers is the same for both areas, the demand, and therefore the cost of each carrier can be expected to be the same relative to the cost of network resources. As was mentioned in previous sections, the energy cost of an additional carrier will resemble a step function assuming two different RF chains are required for the two carriers.

The second scenario in FIG. 6(2) shows another relatively simple case of carrier aggregation. In this scenario, the carriers can be assumed to be operating through the same base station given the same directionality of the carrier footprints. However, the second carrier has a smaller coverage area when compared to the first carrier. This can be attributed to the second carrier being at the edge of the frequency band covered by the given base station antenna. This means the second scenario falls into the category of intraband, non-contiguous carrier aggregation.

This creates different cost considerations for the second scenario relative to resource allocation. Because the coverage of the second carrier is smaller than the coverage of the first carrier, there will be less demand for the second carriers resources. This means the cost of resource blocks on the second carrier will be less than that of the first carrier based on the simple concept of supply and demand. Additionally, there are different energy costs to the user when comparing the two carriers. The second carrier has a smaller coverage area, requiring users to transmit at a higher power, incurring an energy consumption cost that is greater on the second carrier.

The third scenario FIG. 6(3) represents a more complex scenario. This scenario depicts two carriers originating from the same physical base station location, but from different antennas. This can be determined by the different directivity of the coverage patterns. The different carriers could have similar coverage areas, but are almost disjointed in their coverage areas. This means there will be a few users that can utilize both carriers, while most users will use only one carrier. The two carriers are flexible in frequency since they are operated on different antennas, which means that the intraband contiguous, intraband non-contiguous, and interband contiguous carrier aggregation scenarios are possible. It is most likely that this scenario represents interband non-contiguous carrier aggregation. The amount of demand and cost of network resources for each carrier is dependent on the coverage area of each carrier. Two instances of the scenario in FIG. 6(3) are considered.

The first of these instances is where the coverage area of each carrier is nearly identical. Assuming uniform distribution of users, the demand on each carrier would be almost identical making the price of network resources effectively the same. The cost to run two carriers will be greater, similar to the step function in the previous scenarios. The second instance is that the two carriers have differing coverage areas. This means that the carrier with less coverage will have less demand and therefore cheaper network resources.

In addition to the cost of network resources, which varies based on carrier coverage areas, there will be greater energy consumption by both carriers. The carriers are basically non-overlapping, so users on both carriers will effectively be on the edge of each network. Another consideration that should be made in this scenario is the fact that the time each user will be in the coverage area of both carriers will be intermittent. This will cause the user to drop in and out of carriers. Like any handover, the overhead required to complete these transactions will increase the latency of the system.

The final scenario in FIG. 6(4) is representative of a scenario where the primary carrier has a wide coverage area as in all the previously described scenarios, but the second carrier has satellite base stations that provide very limited coverage of the second carrier. These satellite base stations can be considered to be relay nodes or femtocells. The second carrier is flexible in frequency, which allows for intraband contiguous, intraband non-contiguous carrier aggregation. Like the previous scenario, it is most likely that this scenario enables interband non-contiguous carrier aggregation, given its flexibility.

When considering the cost of the network resources on each carrier, the fact that the second carrier has much smaller coverage areas, the demand will be much smaller. This means that the cost of the secondary carrier network resources will be much less than for the primary carrier. The energy cost in this scenario will essentially be a step function for the addition of another carrier RF chain. Since the secondary carriers are relays or femptocells and are well within the coverage areas of the primary carrier, the energy consumption will not increase in the primary carrier. The secondary carrier energy will be greater given the nature of relays and or femptocells and the limited ranges. Like the previous scenario in FIG. 6(3), mobile users will move in and out of the second carrier frequently, so the overhead required to acquire and reacquire the second carrier (like in a cell network handover) will increase the latency cost in this system.

Each of the carrier aggregation scenarios illustrated in FIG. 6 presents an important scenario for testing resource allocation methods, handover algorithms in the presence of multiple carriers, user hardware testing, and energy saving algorithms on the part of the user.

In addition to limitations of carrier coverage, there are other physical layer considerations that should be made when looking at carrier aggregation. These include fading scenarios, user mobility, and specified frequency bands of operation. All of these factors should be considered when developing algorithms for carrier aggregation.

When considering what frequency band to operate in, it is important to consider the loss properties of certain frequencies. It is known that lower frequencies with longer wavelengths can travel greater distances than higher frequencies, which have shorter wavelengths. Operating at frequencies with higher losses incurs more bit errors and therefore a higher Bit Error Rate (BER). In order to maintain a constant BER, the modulation scheme would be changed based on the frequency band. This means that in any given resource block, the amount of information would increase or decrease based on the required modulation scheme that is associated with a given frequency band. Equation (5) represents the relationship between frequency and received power, where $P_r$ is the power received from a one way transmission, $P_t$ is the transmitted power, $G_t$ is the transmitter antenna gain, c is the speed of light, $f$ is the center frequency of the transmitted signal, and R is the distance between the transmitter and receiver.

$$P_r = \frac{P_t G_t c^2}{f^2 (4\pi)^2 R^2} \quad (5)$$

An easy way to incorporate these modulation schemes is to scale the independent axis of all utility functions based on the required modulation scheme. This allows the utility to the user to be measured absolutely in terms of the amount of information sent over the network.

Another important physical layer consideration is the fading environments and mobility of users. These can be grouped together since fading environments typically are dependent on the users speed through their environment. Fading environments must be considered in both frequency and time. In time, there are two types of fading, fast and slow time fading. Fast fading refers to fading that happens within a symbol time, while slow time fading refers to the scenario where fading occurs at intervals longer than a symbol time. In frequency, there are again two types of fading, frequency selective and flat fading. Frequency selective fading refers to the scenario where fading occurs within the bandwidth of the signal, where flat fading occurs across a larger bandwidth than that of the signal itself.

When considering fading scenarios for mobile users, slow, flat fading is assumed because fading within a symbol period or within a signal bandwidth is unlikely. The mobility of the user also effects the amount of fading. The faster the user is moving through its environment, the more fading that is occurring. The amount of fading determines the type of channel the user must contend with. These channel parameters will change the modulation scheme required for each user to maintain a constant BER. Some possible modulation schemes and their bandwidth efficiency are presented in Table 2.

TABLE 2

Spectral Efficiency of Modulation and Coding Schemes

| Modulation Level | Coding Rate | Spectral Efficiency (bps/Hz) |
|---|---|---|
| QPSK | 1/2 | 1 |
| QPSK | 3/4 | 1.5 |
| QPSK | 1 (no coding) | 2 |
| QAM | 1/2 | 2 |
| QAM | 3/4 | 3 |
| QAM | 1 (no coding) | 4 |
| QAM | 2/3 | 4 |
| QAM | 3/4 | 4.5 |
| QAM | 1 (no coding) | 6 |

The present embodiments do not specifically account for differing and changing channel characteristics, such as the effect of fading on resource allocation, but similar to the scaling of the x-axis to represent information bits for the cases of different frequency bands, one skilled in the art recognizes that the same thing can be done when considering the channel characteristics of each user.

As mentioned in previous sections, user hardware implementation determines what type of carrier aggregation the user is able to physically achieve. The types of carrier aggregation that are possible are intraband contiguous, intraband non-contiguous, and interband non-contiguous, as mentioned earlier in this chapter. Several different implementations for user hardware are possible based on Component Carrier (CC) and are shown in FIG. 7.

Examples of user hardware that allows both intraband and interband carrier aggregation is shown in FIG. 7. Those designing user equipment may prefer to design a more simplistic RF chain structure to allow for varying carrier aggregation capabilities, while balancing cost with hardware capability. This gives four main RF hardware options. The first option only contains a single RF chain and requires bands to be contiguous for carrier aggregation. This option is shown as the bottom RF chain in FIG. 7. The second and third options are similar, again containing only one RF processing chain, but allowing demodulation of non-contiguous carriers within the same band. The second and third option would differ in that they can be completed either in hardware or software, respectively, and are shown as a modified version of the bottom RF chain in FIG. 7. The final hardware has two separate RF chains allowing interband in addition to intraband carrier aggregation implementations and is what is represented in FIG. 7. This is the most costly from a user equipment as well as an energy consumption perspective, but it allows the user the most flexibility in choosing carriers and may allow for low frequency operation in the public service band, as an example. User hardware limitations should be considered when simulating network demand, since not all users will be capable of operating on all carriers. The embodiments discussed herein assume all users are able to use all carriers as long as they are in range.

There are several approaches to multiple carrier scheduling initially explored in its application to carrier aggregation. These methods include packet scheduling resource allocation, user grouping, and utility maximization. All of these methods are detailed in this section.

The simple approach to packet scheduling is round robin scheduling. This method attempts to balance the load across the network by assigning a new user to the network to the carrier(s) with the least amount of current users. An example of this is shown in FIG. 8.

This approach is fair from a network perspective, since users will be approximately equal on each carrier. The approach is similar to opportunistic assignment where a user looks for the most available carrier. There are some drawbacks with this method for resource allocation. One drawback is the performance of the entire network. Typically, since users are allocated to given carriers, the network as a whole may be inefficient in terms of throughput and bandwidth. The round robin approach is also channel unaware. This means that the method is unaware of users at the edge of the network versus those users at the core of the network. An illustration of the core and edge of the network is shown in FIG. 9.

There are some approaches that seek to improve performance of the network in terms of throughput by making the assignment to a given carrier, channel aware. Improvements of 41 percent were seen when the round robin scheduling method was adjusted to make the scheduling, channel aware. Essentially, the network edge is prioritized so that it is given a more fair representation in packet scheduling. The only consideration made for carrier aggregation with this algorithm is the fact that all requests for additional carriers will be treated equally whether it be from one user or the next. This does not take into account the utility to be gained by one user on one carrier only versus a user with primary and secondary carriers. The present embodiments consider the case of utility maximization for each user across multiple carriers.

In addition to round robin scheduling, there are load balancing resource allocation methods that attempt to maximize a throughput metric. This metric can be used both in the case of single carrier and multi-carrier scenarios although the maximization of throughput across carriers is the only carrier aggregation consideration that is made. Equation (6) represents the metric for multiple carriers, where $R_{k,i,j}$ is the throughput of user k on component carrier i and Physical Resource Block (PRB) group j, and $$\sum_{i=1}^{N} \tilde{R}_{k,i}$$

is the average throughput k across all N carriers available on the network.

$$\text{Metric}_{k,i,j} = \frac{R_{k,i,j}}{\sum_{i=1}^{N} \tilde{R}_{k,i}} \tag{6}$$

These known packet scheduling algorithms do not consider optimizing the utility across all users for multiple carriers. However, all of these packet scheduling algorithms attempt to distribute the load across all carriers, and some consider improving the performance across the users including throughput across the network. Because throughput does not necessarily translate directly to utility on the network, it is unknown whether these algorithms would provide each user with its required data rates for all applications.

User grouping is another scheduling algorithm that has been considered specifically for the case of carrier aggregation. In this algorithm, the scheduling is based on first grouping all users on the network based on the number of carriers they are able to aggregate. This grouping can be determined several ways.

The first criteria for grouping users is based on the each user's equipment capability. Release 8/9 devices (see 3GPP Technical Specifications and Technical Reports) are not capable of carrier aggregation, so they would be placed in the single carrier grouping. Release 10 devices (see 3GPP Technical Specifications and Technical Reports) would be placed in categories according to the number of carriers they were able to support. This means a user with two RF chains would be placed into one group, while a user with three RF chains would be placed into another group.

Another criteria when determining user groupings is the number of users within each carrier's coverage area. This means users capable of carrier aggregation would be grouped also based on their proximity to each carrier's base station and the relative coverage areas. An illustration of this grouping is provided in FIG. 10.

Once users are grouped appropriately based on the number of carriers they are able to use, the scheduling part of the User Grouping algorithm can take place. The goal of this algorithm is to maximize the ratio of achievable instantaneous data rate over the average received data rate. This is computed based on resource blocks and the average rate per user. The user that achieves the highest ratio for a given resource block is assigned the Physical Resource Block (PRB). Equation (7) represents this user grouping scheduling condition, where the resource block n is allocated to user that achieves the highest ratio of instantaneous to average rate. The instantaneous rate for user i on resource block n is defined as $r_i(n,s)$. The average rate for user i is defined as $\overline{R}_i(s)$ $$i^* = \arg\max_{i} \frac{r_i(n,s)}{\overline{R}_i(s)} \tag{7}$$

Although the user grouping resource allocation method is advertised as a proportionally fair allocation, users with consistently higher ratios may be not be assigned resource blocks enough of the time to provide a minimum QoS. The probability of access for a given user is directly related to the instantaneous and average rates for each user. Like the packet scheduling methods, user grouping only seeks to maximize the data rate or essentially the throughput of the network itself. The utility based on rate assigned to the users is again not considered in this resource allocation method. User grouping could result in a low overall network utility. The present embodiments attempt to consider utility maximization across all users on the network as a method for optimally allocating resources.

The final category of previous resource allocation work for carrier aggregation is a method that considers maximizing the utility across the network. In this method, maximizing the utility is approximated to maximizing the increase in utility based on user resource allocation. An important assumption made in this method is that each user utility function can be approximated by a simple diminishing returns model and the network utility is simply the summation of all the user utility functions as seen in Equation (8), where U(t) is the total network utility as a function of time, t. The network utility represents the sum of all K user utility functions. A utility function for user k is defined as ln R(k,t) at time t.

$$U(t) = \sum_{k=1}^{K} \ln R(k,t) \tag{8}$$

Since the network utility is being maximized, differentiation across the sum of user utility functions is considered in this method. Equation (9) represents differentiation of the network utility function and Equation (10) represents the scheduling condition, where r(k,n,m,t) is the expected throughput for a user k on the $n^{th}$ component carrier, the $m^{th}$ PRB, at time t, and R(k,t) is the average throughput for user k at time t. This formulation is similar to the packet scheduling formulation presented earlier herein. In this construct user $k^t$ is assigned the $m^{th}$ PRB on the $n^{th}$ carrier. The assumption is made that the utility of a user can be defined as a function of throughput and that throughput is defined by information capacity of a given user.

$$\Delta U \approx \sum_{k=1}^{K} \frac{R(k, t+1) - R(k, t)}{R(k, t)} \qquad (9)$$

$$k' = \arg\max_{k} \frac{r(k, n, m, t)}{R(k, t)} \qquad (10)$$

This algorithm assumes that expected throughput for a given user can be provided by the user or is known by the network. The assumption is also made that the utility is defined as a function of time. This would be true in the case of a user closing and opening applications over time. However, maximizing the change in utility over time does not necessarily maximize utility over a static user utility function. This utility maximization is completed similar to the packet scheduling presented in terms of throughput.

In the embodiments described herein, the analysis generalizes resource scheduling that maximizes utility across multiple carriers. Unlike the utility maximization method, the utility functions for users can be different and are not necessarily a member of the diminishing returns model. Also, the proposed modified Frank Kelly algorithm implemented in the embodiments allows the users to maximize their individual utility functions by bidding on resources. This iterative solution allows the user to dictate to a point the amount of resources it is allocated. This method of scheduling across multiple carriers also allows for a tractable, practical solution, taking into account the primary and secondary carriers present in the 4G LTE-Advanced 3GPP standard.

As mentioned earlier, the utility functions of smart phones are based on the utility function of the applications that require network resources. These application level utility functions belong to both the elastic traffic group and inelastic traffic grouping. The utility function of the device can be described as a sum of these utility functions with priorities given to the application utility functions by the user device. Accordingly, embodiments herein determine how to use these inelastic sums of application utility functions in order to determine the appropriate rate allocation through a modified version of the Frank Kelly algorithm. Since a strictly elastic, or concave, utility function is used when allocating rates in wireless networks, the embodiments compare the results of the inelastic utility function to its concave approximation, determined through curve fitting.

Embodiments herein further determine rate allocation as it pertains to the carrier aggregation scenario. As discussed above, previous work has proposed packet scheduling and resource allocation methods based on round robin, user grouping, and network utility maximization. The present embodiments add another method of utility maximization across multiple carriers to this list of algorithms. All previously described base station scenarios are considered and results such as rate allocation to users and shadow prices for each carrier are illustrated.

As mentioned earlier, application utility functions can be fit into three different categories: strictly inelastic utility functions, strictly elastic utility functions, and an inelastic utility function that has elastic qualities after a minimum data rate. For the present embodiments, it is assumed that a user will have one of each of these types of utility functions, each with randomly assigned priorities for importance.

The following assumptions were made about the categories of utility functions. It is assumed that the strictly inelastic, step function response for a utility function represents a voice call application, which can be said to have a codec requirement between 16 and 64 kbps. For the simulations performed, a codec requirement was randomly chosen between these two limits and a step function was assumed. By nature of the step function, the derivative of this function is a delta function at the defined codec data requirement. Equations (11) and (12) represents the utility function of the voice application and its derivative, where $U_{voice}(r)$ is the utility function, $U'_{voice}(r)$ is its derivative and r is the rate allocated to the application. In both equations, $r_{min,voice}$ is the minimum data rate required for a particular voice codec. It should be noted that application data rates are provided in Table 1 above.

$$U_{voice}(r) = u(r - r_{min,voice}) \qquad (11)$$

$$U'_{voice}(r) = \delta(r - r_{min,voice}) \qquad (12)$$

The second type of application that was considered is strictly elastic, or strictly concave, for a defined rate interval. In this case, it was assumed that the strictly elastic application was email or social media messages. Emails can vary in size and be MB (megabytes) in size, but since these items can be downloaded one bit at a time, as detailed above, there is a strictly concave nature to the function. Equations (13) and (14) represent the email utility function and its derivative, where $U_{email}(r)$ is the utility function for email, $U'_{email}(r)$ is the derivative of the utility function, and r is the rate allocated to the application. The function $f_{email}$ is assumed to be a concave function. The possible concave functions are presented in Table 3.

$$U_{email}(r) = f_{email}(r) \qquad (13)$$

$$U'_{email}(r) = f'_{email}(r) \qquad (14)$$

The third type of utility function is the inelastic utility function that exhibits concave behavior after a minimum required data rate. As described above, this can be representative of video streaming or online gaming. The example of video streaming was assumed. Given the technological capabilities of current smart phones, there are two logical options for video streaming requirements, standard definition video streaming and high-definition video streaming. One of these two options is randomly chosen in each Monte Carlo instantiation. In order to represent the varying required minimum data rates required within these two video streaming categories, the minimum date rate required was randomly determined between the limits detailed in Table 1. Equations (15) and (16) represent the video application utility function and its derivative, where $U_{video}(r)$ is the utility function, $U'_{video}(r)$ is the derivative, and r is the rate allocated to the application. In each equation, $r_{min,video}$ is the minimum rate required for a given video application. Again, $f$ is assumed to be a strictly concave function and possible concave functions are provided in Table 3.

$$U_{video}(r) = \begin{cases} 0 & r \leq r_{min,video} \\ f(r - r_{min,video}) & r > r_{min,video} \end{cases} \qquad (15)$$

$$U'_{video}(r) = \begin{cases} 0 & r \leq r_{min,video} \\ f'(r - r_{min,video}) & r > r_{min,video} \end{cases} \qquad (16)$$

Another consideration accounted for in the present embodiments is the need to normalize each of these application utility functions before combining multiple application utility functions into a total utility function. It is important that the maximum normalized utility function for each application is equal to one. This is because any application that dominates before prioritization of applications in terms of the utility function will always dominate no matter its prioritization. This means that each function was scaled by its maximum utility in the simulation. Example application utility functions are given in FIG. 11. Equation (17) represents a normalized email utility function, where $U_{email,final}(r)$ is an example utility function and $U_{email}(r_{max})$ is the maximum of the utility function at the maximum rate achievable, $r_{max}$. In this case, the maximum rate is considered to be the maximum rate possible for a given user. Simplistically, each carrier is assumed to be 20 MHz. Since only an aggregation of two carriers is assumed, the maximum rate for any user is 40 MHz in the carrier aggregation case. In the case of no carrier aggregation, the maximum rate is assumed to be 20 MHz.

$$U_{email,final}(r) = \frac{U_{email}(r)}{U_{email}(r_{max})} \quad (17)$$

Priorities were randomized in MATLAB and the utility function was scaled to allow for the exploration of applications running the background as opposed to applications be currently utilized by any given user. An example composite utility function is provided in FIG. 12. It is easy to see the three discontinuous points in the utility function. Since the discontinuous points in the utility functions will also cause discontinuities in the derivative, there will be multiple solutions to consider when determining optimal rate allocations. The symbolic representation of the total utility function is given in Equations (19)-(20), where a is the vector of application priorities, rand is the random number generator for uniformly distributed random variables, $U_{total}(r)$ is the linear combination of prioritized application level utility functions, and $U'_{total}(r)$ is the derivative of the total utility function. In both the total utility function and its derivative, the application level utility functions represent their normalized application utility functions introduced previously. The number of applications is fixed in the embodiments presented herein, but one skilled in the art understands that it is expected that users may have a differing number of applications, all of different types and utility functions.

$$\alpha = \text{rand}(1,3) \quad (18)$$

$$U_{total}(r) = \alpha(1) * U_{voice,final}(r) + \alpha(2) * U_{email,final}(r) + \alpha(3) * U_{video,final}(r) \quad (19)$$

$$U'_{total}(r) = \alpha(1) * U'_{voice,final}(r) + \alpha(2) * U'_{email,final}(r) + \alpha(3) * U'_{video,final}(r) \quad (20)$$

In order to justify the use of this new utility function that is a sum of the individual application utility functions, it is necessary to compare the rate allocation results to its concave fit counterpart. There are a few assumptions made in the current embodiments in order to achieve a concave, elastic fit utility function that allows for the rate allocation.

One of these assumptions, perhaps the most important assumption, is the fact that the y-intercept of the concave fit should be zero. This ensures that there is no negative point of the utility function. This is done through the use of polyFitZero, which is available through the Mathworks community.

Another important assumption is that the best fit can be defined as the concave function that provides the smallest Mean Squared Error (MSE). Equation (21) represents MSE mathematically, where MSE is the mean square error, x is the actual vector, z is the approximate vector, and n is the number of values compared. The table of concave fit functions along with their derivatives is provided in Table 3. Each of these functions was tested and the minimum MSE determined the best concave fit function.

$$MSE = \frac{1}{n} \sum_{n} (x - \hat{x})^2 \quad (21)$$

TABLE 3

| Concave Fit Functions | |
|---|---|
| Concave Function | Derivative |
| ln x | $\frac{1}{x}$ |
| $\log_{10} x$ | $\frac{1}{x \ln 10}$ |
| $\log_2 x$ | $\frac{1}{x \ln 2}$ |
| $\sqrt{x}$ | $\frac{1}{\sqrt{x}}$ |

It was mentioned earlier that there are multiple inputs to the cost function from the user perspective including network resource cost, energy costs, and latency costs. For simplicity, it is considered that the network resource cost is the only cost that is a concern for the user. In future work, energy costs as well as latency based on frequency band should be considered. The network resource cost is assumed to be linear and is determined by the shadow price of the network. Equation (22) represents the cost function, where $c(r)$ is the cost at a rate allocation of r, and $p_{shadow}$ is the network shadow price.

$$c(r) = p_{shadow} r \quad (22)$$

The prior art Frank Kelly algorithm, described above, assumes a strictly concave function, or inelastic utility function when maximizing the utility through proportionally fair resource allocation across the network. The implication of this assumption requires each user to have only one optimal rate based on a network defined resource price. Without a single optimal solution, the user must have a way to choose between multiple solutions in order to achieve optimal rate allocation and shadow prices within a reasonable number of iterations.

The modification of the Frank Kelly algorithm discussed with reference to the preferred embodiments herein applies to cases of multiple solutions and arbitrary utility functions. Multiple solutions arise from the discontinuities in the summation of application utility functions to make a device utility function. Equation (23) represents the required utility function, where $U_{total}$ is the total utility function for a given user, and $U_N(r)$ is the utility function of the $N^{th}$ application. The number of applications is arbitrary in this instantiation. However, as described in the previous section, for the exemplary preferred embodiments, the number of applications is designated as three for each user. The total utility function must have concave properties for at least one interval. Equation (24) represents the requirement for a user utility function, where [a, b] represents any interval between defined rate interval, [0, $r_{MAX}$] and $\alpha$ and $\beta$ represent arbitrary real values. Without this requirement, the rate allocation for a given user should be completed through water-filling and cannot be done through an iterative approach like the Frank Kelly algorithm. The assumption of a concave region or regions within the utility function is valid given the assumption of users with smart phones, or devices running multiple applications.

$$U_{total} = U_1(r) + U_2(r) + \ldots + U_N(r) \quad (23)$$

$$\exists [a,b] \in [0, r_{MAX}]: U_{total}(\alpha r + \beta r) \geq \alpha U_{total}(r) \pm \beta U_{total}(r) \quad (24)$$

As described above, the Frank Kelly algorithm is an iterative approach that starts with initial bids from the users. These initial bids determine the shadow price for the network resources and the resource allocated to the user initially. The user then compares this allocated rate to what it considers to be its optimal rate based on the shadow price. Assuming user utility functions with multiple solutions, it is necessary to now choose between multiple solutions. This is where the modification to the Frank Kelly algorithm is made in accordance with the present embodiments. Equations (26)-(27) represent the change made to the Frank Kelly algorithm, where $r_{i,opt}$ is the optimal rate allocation as determined by user i given p as the network shadow price and $U_i$ and $U'_i$ as the utility function and its derivative for user i. In this case, there are multiple solutions for the optimal rate allocation, and the final solution for $r_{i,opt}$ is determined to be the solution closest to the network allocated rate $r_i$ for user i. The change represents the logic required to decide which of the multiple solutions represents the single optimal rate allocation solution.

$$r_{i,opt} = \operatorname{argmax}[U_i(r_{i,opt}) - r_{i,opt} p] \quad (25)$$

$$U_i(r_{i,opt}) = p \quad (26)$$

$$r_{i,opt} = \operatorname{argmin}(|r_{i,opt} - r_i|) \quad (27)$$

Including this adjustment to the remainder of the Frank Kelly algorithm gives the modified algorithm seen in the following pseudo-code. As with the definition the Frank Kelly algorithm earlier in this material, R is the total rate available on the network and the sum of bids is represented in $\Sigma_{j=1}^n w_i$, where $w_i$ is the is the bid for a user i.

$w_i$ = initial bid of user i $$p = \frac{\sum_{i=1}^n w_i}{R}$$

$$r_i = \frac{w_i}{p} = \frac{w_i}{\sum_{j=1}^n w_j} R$$

$\max[U_i(r_i) - r_i p]$ $U'_i(r_{i,opt}) = p$ while $r_i \neq r_{i,opt}$ do $w_i = r_{i,opt} p$ $$p = \frac{\sum_{i=1}^n w_i}{R}$$

$$r_i = \frac{w_i}{p} = \frac{w_i}{\sum_{j=1}^n w_j} R$$

$\max[U_i(r_i) - r_i p]$ $U'_i(r_{i,opt}) = p$ $r_{i,opt} = \operatorname{argmin}(|r_{i,opt} - r_i|)$ end while In order to deal with multiple solutions, the user finds all intersections of the shadow price and the derivative of its utility function and then chooses between the multiple solutions based on the rate that has already been allocated. The condition used in this modified algorithm for choosing the optimal solutions from multiple solutions is to determine the solution closest to the rate already allocated by the network. This choice can be rationalized through supply and demand. If a user chooses a rate that is far away from the rate already allocated to it by the network, his bid will change dramatically. The result will be a large change in demand on the network for resources. This change in demand will yield a change in resource allocation and will start the iterative process again.

Similar to the prior art Frank Kelly algorithm, the users bidding on network resources are not required to have knowledge of the available resources. The bids of the users merely reflect how much rate they would like to receive from the network. The network is the only party required to have knowledge of the amount of resources that are available. This is a valid assumption given the network controls resource allocation for a given portion of frequency.

There are some limitations to the method for dealing with multiple solutions. The initial bid made by each user determines the convergence speed as well as the initial rate allocated to each user. Any given initial rate will influence which of the unique solutions is chosen to be the optimal user rate allocated. For the embodiments discussed herein, it is assumed that each user will input the same first initial bid and the bid will be somewhat dependent on the number of users on the network (relative demand). This will allow for reasonable convergence. In the results section discussed below, the effect of a starting bid for several different numbers of users is examined.

The addition of multiple carriers adds additional complexity to the rate allocation problem. From a user perspective, the utility to the device does not change based on which carrier the network resource allocates the resources. What changes for the user is the cost. By adding another carrier, the network resources cost is dependent on which carrier allocates the rate to the users, the energy consumption cost rises if another RF chain needs to be added, and latency cost changes based on required modulation schemes.

As mentioned previously, only the cost of network resources is considered in the embodiments herein, but one skilled in the art recognizes that energy consumption and latency costs may also be considered. Since each user's utility function is not bivariate and is dependent only on the sum of the rates from both carriers, it is not practical to determine a joint solution at the current time for multiple carrier rate allocation. In order to implement a solution, each carrier's resources are allocated in a specified order. As described herein, the current implementation of carrier aggregation designates a primary carrier for both the uplink and downlink channels. This means that scheduling of resources will occur through one carrier including multiple, if available, secondary carriers. By ordering the carriers in terms of availability, frequency band of choice, or other such criteria, the solution for allocation across multiple carriers can be simplified.

This present embodiments can also be justified with practical implementation concerns. It is assumed that in some scenarios, the secondary carriers will have much less coverage, availability based on higher priority uses, or will have unfavorable frequency bands of operation. In these cases, the user will want to optimize equipment performance based on energy consumption and the amount of overhead time required in order to achieve a limited amount of network resources. In this case, it would make the most sense for the user to rank the carriers and in doing so gain the most reliable network resources for carrier aggregation.

In addition to these operational concerns, the purpose of carrier aggregation is to augment the current bandwidth available to mobile wireless devices. Augmentation of allocated resources to a given user implies the utility to the user will be marginally improved as carriers and network resources are added. For these reasons, a primary carrier and one secondary carrier are assumed here. The primary carrier allocates its resources first and then the secondary carrier allocates its resources. All users within the coverage areas of the primary and secondary carrier will adjust their utility functions when bidding on secondary carrier resources. This adjustment shifts the utility function in the resource domain and the starting point in rate is equal to the rate allocated to a given user by the primary carrier. By ordering all available carriers, this method can be scaled to more than two carriers. Equation (28) represents the adjustment of the utility function for a user i, where $U_{total,Carrier2,i}(r)$ is the resulting utility function for user i on carrier 2, $U_{total,i}$ is the total utility function for user i and $r_{allocated,Carrier1,i}$ is the rate already allocated to user i on carrier 1.

$$U_{total,Carrier2,i}(r) = U_{total,i}(r + r_{allocated,Carrier1,i}) \quad (28)$$

Equation (29) represents the generalized form of this utility function adjustment for user i, where $U_{allocated,Carrierk,i}(r)$ is the utility function for user i for rate allocation on carrier k, and $\sum_{j=1}^{k-1} r_{allocated,Carrier j,i}$ is the rate previously allocated on all carriers through k−1. Equation (30) extends this utility function to its derivative, where $U'_{total,Carrierk,i}(r)$ is the derivative of the total utility function for user i on carrier k. This concept of marginal utility can also be represented graphically in FIG. 13. As mentioned previously, the independent axis is moved to represent the rate that has already been allocated to a user.

$$U_{allocated,Carrier k,i}(r) = U_{total,i}\left(r + \sum_{j=1}^{k-1} r_{allocated,Carrier j,i}\right) \quad (29)$$

$$U'_{total,Carrier k,i}(r) = U'_{total,i}\left(r + \sum_{j=1}^{k-1} r_{allocated,Carrier j,i}\right) \quad (30)$$

For these scenarios, two carriers are assumed. Using the utility function representations introduced above, the multiple carrier rate allocation is represented in the following pseudo-code, where m is the total number of users, frank-Kelly$_{Modified}$ is the modified Frank Kelly algorithm, $U'_{total,i}$ is the derivative of the total utility function for user i, and $w_k$ is the vector of user bids for carrier k which is sequentially carrier 1 and carrier 2 in this example.

rates$_{Carrier1}$=frankKelly$_{Modified}$($U'_{total,Carrier1}(r), w_1$)

for i=1:n do $U'_{total,Carrier2,i}(r) = U'_{total,i}(r + r_{allocated,Carrier1,i})$ end for rates$_{Carrier2}$=frankKelly$_{Modified}$($U'_{total,Carrier2}(r), w_2$)

For an arbitrary number of carriers, m, the resource scheduling algorithm for carrier aggregation can be generalized to the following pseudo-code.

for k=1:m do rates$_{Carrierk}$=frankKelly$_{Modified}$($U'_{totalCarrier}(r), w_k$)

for i=1:n do $U'_{total,Carrier k+1,i}(r) = U'_{total,i}(r + \sum_{j=1}^{k} r_{allocated,Carrier j,i})$ end for In the event that no rate was allocated to a given user by any carrier, no adjustment will be made to the utility function for that user. Unlike algorithms introduced above, this algorithm seeks to maximize utility as well as complete resource allocation across multiple carriers with an arbitrary user utility function. The sequential, instead of joint, solution fits within the control specifications of 4G LTE-Advanced 3GPP standard for carrier aggregation. In addition to its practicality, it avoids the need for a completely informed network controller, like the utility maximization result introduced above. By allowing the user to bid on resources, any user can choose to achieve higher resource allocation if desired. This is important when considering a capitalistic approach to wireless resources. This novel approach to rate allocation in the presence of carrier aggregation provide methods that can be implemented within the current construct of the 3GPP standard.

All scenarios in FIG. 6 are implemented in MATLAB in order to exemplify the present embodiments. Exemplary program code for executing the determinations described herein is set forth in the Appendix. Users are evenly distributed within the primary carrier coverage area, which will remain constant throughout the scenarios. The number of users within each of the carrier coverage areas is determined and the rate allocation is completed on the primary carrier, followed by the secondary carrier.

Starting bids should be approximately correct based on the demand of the network in order to cause convergence to the optimal network solution in a timely manner. The method for determining the correct starting bid is not considered, but through simulation it appears that more users required a lower starting bid to converge. The starting bid for different numbers of users was considered in the first section of results and these simulation results carried forward to the carrier aggregation scenarios. The number of users on a given cellular network will vary, so a number of cases are considered herein. To provide a complete comparison between linear combinations of application-level utility functions to their concave approximations, simulations with 5, 10, and 50 users were considered. For the scenarios, it was assumed that the number of users would be high, given the demand on current cellular networks. In these simulations, approximately 50 users were distributed within the limits of the primary carrier.

Examples of the MATLAB scenarios are provided in FIGS. 14-17. The primary carrier in these cases does not change. It should be noted that the distances are in kilometers. These simulations merely attempt to describe the results of carrier aggregation and resource allocation with carrier coverage areas relative to each other.

The following is separated into two parts. The first part describes the results of the modified Frank Kelly algorithm for non-concave, piecewise functions as compared to strictly concave utility functions. The second part describes the results of the modified Frank Kelly algorithm as applied to rate allocation of two carriers. This also means that the algorithm for rate allocation across multiple carriers in sequence is tested.

A comparison of convergence, user resource allocation, and network shadow prices is made for the modified Frank Kelly algorithm between utility functions representing a sum of application level utility functions to the best fit concave function. As described in previous sections, the minimum MSE is used to determine the best concave fit from a pre-defined list of concave functions. This best fit concave function is used for comparisons in all results to follow.

The convergence properties of an iterative solution are important to consider. In this case, the comparison will be made between the linear combination of the application level utility functions to their concave utility function approximations. When running the simulations, the maximum number of iterations was set to 500 in order to allow for a sufficient number of iterations to converge. However, 500 iterations is not desirable when determining the convergence properties of an iterative solution in real-time or near real-time. In the results of this section, convergence below 100 iterations is considered to be a result that converges in a timely manner. For comparisons between concave and non-concave utility function results, only cases that resulted in a converged solution were considered. Results that did not converge were removed from consideration.

The first set of results, considers the rate of convergence of the modified Frank Kelly algorithm for non-concave utility functions as compared to its concave fit counterpart. A range of initial bids and number of users was considered. It is assumed that initial bids will be the same across all users. Since utility functions of all the users are not identical, all users may not have the same initial bid in a real-world scenario. One skilled in the art will recognize that consideration of optimal bids on a per user basis may be incorporated in a more refined example. The first case that will be considered is the case of 5 users. Initial bids of 0.01, 0.1, and 1 were considered in this case. The percentage of cases that converge over 1000 trials can be seen in Table 4.

TABLE 4

Fraction of Cases that Converge, 5 Users

| Initial Bid | Concave Fit Function | Non-Concave Utility Function |
|---|---|---|
| .01 | 0.99 | 0.94 |
| .1 | 0.99 | 0.99 |
| 1 | 1 | 0.94 |

The rate of convergence is represented in FIG. 18 (concave fit utility function) and FIG. 19 (non-concave utility function). From Table 4 and the following figures it can be concluded that the concave fit results always converge at a rate faster than their non-concave utility function counterparts. Examining the concave fit results only, it can be concluded that the starting bid has very little to do with the rate of convergence and changes by a factor of 10 in the initial starting bid do not drastically change results.

However, when the non-concave utility function results are considered, results show dependence of the rate of convergence on the initial starting bid. This sensitivity can be explained by the fact that the non-concave utility functions may have multiple solutions in the construct of the modified Frank Kelly algorithm. The choice between these solutions is dependent on the rate allocation given to the network from each user and thus the initial bid of each user. If the initial bid is incorrectly chosen, there may be oscillation between the multiple possible solutions. One skilled in the art recognizes that the optimal starting bids for non-concave utility functions can be determined in order to cause fast convergence comparable to concave function convergence time. When considering previous work on rate allocation, the assumption of a concave function will simplify both an iterative solution and an algebraic solution. However, these concave results may not capture the detail of application level utility functions.

From FIG. 19, it can be seen that the best convergence occurs with the initial bids 0.01 and 0.1. These bids essentially create the same convergence behavior. Choosing 0.01 to be the optimal bid in the case of 5 users, the rate allocation results and shadow price results can be compared across non-concave utility functions and the concave fit utility functions.

FIG. 20 represents the final shadow price of network resources for the case of 5 users and an initial bid of 0.01. FIG. 21 represents the shadow price of network resources in the case of the non-concave utility functions for the same starting bid and number of users. It can be seen that the concave fit function results in a much lower network resource price when compared to the non-concave utility function results. This difference is on the order of 100 times different. This can be explained by the fact that the concave fit function has no discontinuities. With discontinuities, because of individual application utility functions, the non-concave utility function has the possibility for higher optimal rates and therefore will bid higher to achieve higher data rates. It should be noted that shadow prices represent the portion of spectrum given to each user. One skilled in the art recognizes that these shadow prices can be scaled by the amount of information a given user can transmit across the network given an allocation of resource blocks in frequency.

The next important comparison is the error in rate allocation when using a concave fit function to approximate a utility function that is a sum of application level utility functions. FIG. 22 represents the error for one of the 5 users on the network as an example. Table 5 summarizes the results for all users on this network and the mean across all networks. These errors should be considered in terms similar to noise power, since, as expected, they are zero mean. In the case of 5 users, the error of user rate allocation error is on average 2.5 MHz. This was determined through an average of user errors in Table 6. Similar to the difference in shadow price, the rate allocation error is due to the fact that there are multiple distinct concave regions. These multiple solutions allow the user to choose to bid for more resources causing a discrepancy in the rate allocated to a different user. Since it is important for a user to bid and be allocated rate based on applications requiring network resources, these discrepancies can be used to argue against traditional concave utility function based methods as presented in previous rate allocation work.

TABLE 5

Resource Allocation Error, 5 Users

| User Number | Rate Allocation Error (Mbps) |
|---|---|
| 1 | 2.3 |
| 2 | 2.5 |
| 3 | 2.5 |
| 4 | 2.6 |
| 5 | 2.8 |

In the cases of 10 and 50 users, the results are similar to the previous 5 user results. The convergence results for the cases of 10 and 50 users are seen in FIGS. 23-26. In the results, it is interesting to note that 10 users shows similar convergence behavior as 5 users. Interestingly enough, the concave results for 50 users shows worse convergence based on initial bids. However the ideal bid of 0.0001 for 50 users shows faster convergence in the case of concave utility functions.

The shadow price results show similar behavior as the 5 user scenario as well. FIGS. 27-30 show these results. It should be noted that, as expected, the network price increases with the number of users. This is because the demand increases with the number of users.

Where the results change dramatically based on the number of users is the error in rate allocation. FIGS. 31-32 show example rate allocation errors for 10 and 50 users. It can be seen that with an increase in the number of users, the rate allocation error decreases dramatically. This can be explained by the fact that a higher number of users on the network means less allocation to all users. Since less rate is allocated, less error is expected. So as the number of users increases, it can be seen that even though the rate allocations approach the results for concave approximations, the shadow prices are still incorrectly calculated. The reason for this is most likely the fact that the discontinuities still prompt the user to demand more resources. This higher demand on the network yields a higher shadow price.

TABLE 6

Resource Allocation Error, All Cases

| Number of Users | Average Resource Allocation Error (Mbps) |
|---|---|
| 5 | 2.5 |
| 10 | 1.4 |
| 50 | 0.2 |

Even though rate allocation error may decrease with an increase in the number of users, network resource prices seem to be vastly different between concave fit functions and non-concave utility functions. This means that concave approximations incorrectly represent the demand on the network and the fact that multiple applications with varying priorities require different minimum rates and have different diminishing return behaviors. The rate allocation methods demonstrated in this section are capable of maximizing network utility while maintaining the fidelity of application level utility functions. The rate allocation error decreases with the number of users, but the shadow prices do not converge to the same answer. In order to correctly represent the demand on the network it is important to add the fidelity of application level utility functions to rate allocation methods.

Next, rate allocation across multiple carriers in different base station scenarios is considered. The sum of application level utility functions is used to represent user level utility functions.

The base station scenarios exemplified in FIG. 6 are used in determining the rate allocation for a network where two carriers are available for scheduling. In the case of carrier aggregation, the present embodiments schedule rates on each carrier by ordering the carrier based on a primary and secondary carrier structure. The examples herein assume only two carriers, one being the primary carrier and one being the secondary carrier.

Similar to the concave fit comparison results, the initial bid is paramount when determining rate allocation with non-concave utility functions. The initial bid for each carrier was determined to be satisfactory at 0.01 or 0.001, based on the non-concave results for 50 users shown previously. For this section a value of 0.01 was used. For the second carrier, the initial bid was determined by testing a range of initial bids, each separated by a factor of ten. Since the method for determining an optimal bid is not discussed herein, the best convergence rate was chosen from the range of tested secondary carrier initial bids. Table 7 details the fraction of iterations where convergence was achieved for each scenario and the associated initial bid. For this section, the number of users was 50 in all cases. These users are uniformly distributed and a varying amount of users will fall within the primary and secondary carriers. There were also 100 iterations completed for each scenario.

TABLE 7

Convergence of Base Station Scenarios

| Scenario | Fraction of Converged | Secondary Carrier Initial Bid |
|---|---|---|
| 1 (FIG. 6(1)) | 0.98 | 0.001 |
| 2 (FIG. 6(2)) | 1 | 0.001 |
| 3 (FIG. 6(3)) | 0.99 | 0.001 |
| 4 (FIG. 6(4)) | 0.65 | 0.001 |

The shadow prices for carrier 1 and 2 are shown in FIGS. 33 and 34, respectively. It can be seen that carrier 1 has a shadow price for network resources when compared to carrier 2. This result can be explained by the fact that based on the general diminishing returns of each user utility function, the added utility provided by the second carrier will be less than that of the primary carrier. Therefore the demand from the user will be less and thus a lower network price will be set.

This can also be explained in terms of the secondary carriers that will be available in carrier aggregation scenarios and the perspective of the user. Secondary carriers may be comprised of available space within the current band, but based on network demands, these carriers may be on-demand carriers and will not always be available to users. From a user perspective, these additional resources will not be expected, but will be "nice to have." Considering the results from this perspective, this rate allocation scheme across multiple carriers is logical in the construct of primary and secondary carriers.

The second scenario shows very similar results to the first scenario. In this scenario, the second carrier has a slightly smaller range of coverage, but the same directionality as the primary carrier. This means that the second carrier will have slightly smaller demand, but possibly only a few less users. This would show very little difference in the shadow prices of the network, but, similar to the first scenario, the second carrier price is less than the primary carrier given the diminishing returns. This again is due to the fact that these resources provide small additional utility, hence they are secondary carriers. FIGS. 35 and 36 show results in terms of shadow prices for scenario 2.

The effect of the smaller coverage area of carrier two is not discernible. This may be due to the fact that the coverage range is not small enough to affect network resource prices. It can be expected that the smaller the coverage area, the lower the price given the lower demand on the network.

As expected, the third scenario results also closely resemble the results of the first and second scenario. The results for this scenario are found in FIGS. 37 and 38. The coverage of the second carrier is, in this case, offset in angle, but represents the same coverage area and therefore the same number of users. Similar to the first and second scenario, the lower shadow price for the secondary carrier is due to the fact that a marginal amount of utility is added for users capable of carrier aggregation. This is true for scenarios 1, 2, and 3.

An important caveat when considering these results is the fact that there is no assumption made on frequency capability of the user handset. If, for instance these carriers were distinct in frequency, then the number of users capable of using the primary carrier versus the secondary carrier will change. One skilled in the art recognizes that user equipment capabilities is an additional consideration that may be taken into account in the determinations discussed herein.

The final scenario shows the most interesting results. Since, in this case, the coverage area of the secondary carrier is representative of the relay base station, there is significantly less coverage area for the secondary carrier. This means with less demand on this secondary carrier, the shadow price can be expected to be much lower in this case. The result in FIGS. 39 and 40 show a result which matches predictions; where the shadow price of the secondary carrier resources are much less than that of the primary carrier.

These results show, unlike Scenario 2, the effect of coverage area on network resource prices. With an increase in the number of relays, the price can be expected to go up based on a higher network demand. The orientation of these relays or femtocells is a consideration. If the distribution of relay nodes is non-uniform, or the concentration of users is non-uniform in the relays, the resource prices will become more difficult to determine.

TABLE 8

Summary of Carrier Aggregation Results

| Scenario | Carrier 1 Shadow Price (Median, Mbps) | Carrier 2 Shadow Price (Median, Mbps) |
| --- | --- | --- |
| 1 (FIG. 6(1)) | 0.0518 | 0.0261 |
| 2 (FIG. 6(2)) | 0.0518 | 0.0227 |
| 3 (FIG. 6(3)) | 0.0521 | 0.0295 |
| 4 (FIG. 6(4)) | 0.0509 | 0.0058 |

A summary of scenario network shadow prices is provided in Table 8.

The results presented deal with start-up scenarios where all users are joining the network at one time. There is also the case where the network is in a steady-state and a few users leave or join the network. This represents two classes of solutions that may also be considered. In addition to steady-state and start-up solutions, the general consideration of sub-optimal solutions may also be considered.

A practical consideration when talking about convergence properties is the difference between steady-state convergence and start-up convergence. The present embodiments consider start-up convergence. In practical terms, start-up convergence considers a network with no users currently on the network. Determining the network resource prices in this case requires more iterations to achieve convergence, since the initial state is determined by the initial bids of the users. In real world scenarios, these start-up cases can be thought of as the case where cell towers are being restarted after outages or new towers are being added to the network. The other case that is not considered is steady-state convergence properties.

Steady-state convergence is the case where there exists a network with a given resource price and resource allocation solution. In this case, adding or removing a small amount of users requires a fewer number of iterations to determine a new network resource allocation and shadow price. This is because the demand of the network will only change due to the statistically small number of users being added or removed from the current network. The smaller change in demand points to a faster convergence. The users can be added and removed from the network based on the fact that users will be moving in and out of coverage areas. The mobile nature of the users effectively homogenizes the network. This means the demand will effectively remain the same on the network once it is in steady-state based on the fact users will be consistently entering and leaving the carrier coverage areas.

In cases where there is no convergence, a solution for network resource allocation and shadow prices is still required in a practical sense. Non-convergence implies the resource allocation provided to the users does not match the optimal solution as determined the users utility functions and the prescribed network shadow price. In this case, using the non-convergent solution will provide a sub-optimal solution, where the error is an unknown. This unknown error can be addressed depending on the scenario.

The simplest case is representative of the steady-state case, where a few users are either being added or removed from the demand. In this case, it is simple to use the previous steady-state network resource price as the basis for each user's bid and ultimately the resources allocated from the network. From the construct of the original and modified Frank Kelly algorithm, these bids are used relative to each other in order to determine the rate allocation. This means that the network resources that are allocated will never provide a solution within the Pareto inefficient region or in the infeasible space, or the network will never under or over subscribe the network resources. Because the change to the network demand is minimal, this suboptimal solution will be effectively a solution delayed in time. This means the network price and resource allocation will reflect the optimal resource price at a previous point in time, but not severely delayed. This type of sub-optimal solution will also occur at each time step based on the mobile nature of users and the time delay in determining the network resource price. Based on the fact that these sub-optimal solutions occur with small changes to the network and the fast changing nature of a mobile network, these sub-optimal solutions should not cause much error across the network.

The more challenging case of non-convergence is the case of start-up scenarios, where the network demand and supply is changing by a statistically significant amount. In this case, as considered herein, approximately one to five percent of the cases do not converge even with approximately optimal starting bids. As mentioned previously, these scenarios still require a solution from a network perspective. In these cases, the amount of error could be large considering the dependence on an initial starting bid. In order to determine a solution, it may be necessary to think of these start-up scenarios in terms of a control system. When a control system does not converge on an optimal solution, it is considered to be in oscillation. In this case, a restart of the control system adjusting necessary parameters is usually considered to achieve a stable solution. In this case, the bids of the users can be adjusted to achieve a convergent solution.

As described herein, two new algorithms are considered. The first algorithm is a modified Frank Kelly algorithm that allows for the use of piecewise, concave utility functions representing a sum of underlying application utility functions. The second algorithm is the use of this modified Frank Kelly algorithm and network resource pricing algorithm when applied to the scenario of carrier aggregation through sequential scheduling.

The results of the modified Frank Kelly algorithm support the notion that there is error induced in the rate allocation and especially the shadow price as a result of approximating a users utility function via a strictly concave, diminishing returns model. The convergence properties of non-concave, piecewise utility functions is highly dependent on the initial starting bid made by users. The embodiments herein do not attempt to explain the requirements that should be placed on initial starting bids in order to gain convergence, but one skilled in the art recognizes that such a determination may be undertaken to understand such requirements. In addition to determining the convergence properties of this modified Frank Kelly algorithm, it is important to consider scenarios where each user will have a different starting bid based on the expected value of the demand on the network and its desired amount of resources.

The resource allocation and network shadow price determination in the presence of two carriers also presents useful results as discussed above. Since the network resources are scheduled first on the primary carrier and then on the secondary carrier, the utility function is adjusted to consider only the added utility of the second carrier. Since the utility functions have an approximate diminishing returns model, the network resource prices on the secondary carrier will always be less. This is what was seen in all scenarios, even those scenarios where secondary and primary carriers operated the same coverage areas. It can be expected that every additional carrier if scheduled in order will have an ever decreasing network price. The expansion of these results to include the price of energy consumption for secondary carriers and any latency costs may cause an even steeper decrease in network prices on secondary carriers.

Energy and latency costs of each carrier, both primary and secondary, may also be considered in order to improve achievable results. Current results only consider network resource costs. Unlike network resource costs, the energy and latency costs represent a more complex cost structure. Energy costs should be considered in terms of battery life costs for the user. In other words, with additional carriers, the energy costs to the user will increase.

The additional energy cost on a per carrier basis is effected by the user hardware implementation as well as the transmit power required given proximity to the carrier and the frequency band of a given frequency band. A user implementation with only one RF chain is representative of the case where the only additional energy required is used for the transmit power required for a second carrier. In this case the transmit power required for the primary and secondary carrier is essentially the same based on the fact a single RF chain can service only one band with current user hardware. The more complex case is user hardware that allows for interband carrier aggregation through the employment of multiple, independent RF chains. With this case, the energy of a second user is a function of the energy required to operate an additional RF chain as well as the transmit power. The energy cost of running a second RF chain is essentially the same as the energy cost for the first RF chain. The transmit power will either be less or more than the power required for the primary carrier depending if it is lower or higher in frequency. The energy cost can be simply represented as a step function and in order for a user to utilize a second carrier, the utility would need to exceed the cost to the user in energy. This means the energy costs would need to be transformed to a dollar cost to represent similar units.

Similar to the energy costs, the latency cost also requires more in depth consideration given its complexity. One factor in determining the latency is the bandwidth efficiency of the carrier. As introduced in earlier sections, the modulation and coding schemes determine the bandwidth efficiency, or the ratio of the number of information bits sent relative to the total number of bits sent across the network. One way to account for this latency is adjusting the independent axis to represent the amount of information bits being passed across the network. This means for a given space in frequency and channel parameters, the amount of information across of the network for a given user and a given carrier will change, which will measure the latency across the network due to bandwidth efficiency. Another form of latency is specific to base station scenarios introduced herein. More specifically, the scenario with relays or femtocells will have a different form of latency. In these scenarios, there is a wired back haul to the main carrier that requires a static two-way time to travel. This form of latency can be represented by a step function. Similar to energy costs, logic can be placed to ensure the utility exceeds the additional latency costs as well as energy and network resource costs. Both energy and latency costs require further investigation, since their representation is more complex than the traditional network resource block cost.

The embodiments herein assume that the secondary carrier will always be the same for all users. This is not necessarily the case given energy consumption, latency, and utility of each user. It is interesting to consider the case where the cost of the second carrier will always be substantially less than that of the primary carrier. An example of this case would be the case where the secondary carrier is provided by way of a relay or femtocell. In this case, the coverage area of the secondary carrier, so the demand on the carrier will practically never match that of the demand on the primary carrier. This means a user within the relay coverage may choose to use this carrier as its primary carrier to maximize its utility less its cost. The network resource cost will not change based on the small amount of users utilizing the relays or femptocells. This provides an example of the complicated, user specific ordering of carriers.

In addition to network resource cost, energy costs, and latency costs, the availability, and reliability of the carriers is important to consider when ordering the carriers for resource scheduling. In the case of non-traditional bands it is important to think about the fact that service may be intermittent. For example, traditionally reserved band, like military or public radio, will prioritize cellular users after the bands traditional users. This means when military or public radio users require the use of the band, cellular users will be denied service. Effectively the probability of availability of a given carrier is important when considering utilizing more overhead costs to schedule resources on a given carrier. One skilled in the art recognizes that prioritizing carriers for resource scheduling in the scenario of multiple carriers may improve outcome.

Overall, this description serves to introduce the complexities of scheduling network resources for smart phones with many applications in the presence of carrier aggregation. With the advent of carrier aggregation, it is important to consider the utility functions as a sum of application utility functions in order to achieve the best results for network pricing and resource allocation. This allows the users to achieve optimal QoS and therefore distribute required rate to its many applications optimally.

The determinations described herein, including the algorithms and program code, are encoded or programmed on a non-transitory computer readable medium or device which is accessible by one or more data entry/input and processing devices including but not limited to at least one processor or server in communication with one or more memory and display devices. The encoding/programming of the non-transitory computer readable medium transforms the medium into a special purpose machine for achieving a specific and concrete result applicable to the scheduling of network resources for smart phone usage. The non-transitory computer readable medium/device may be part of a larger network of such mediums/devices. The various iterations, determinations, generations, ordering, aggregations and other steps of the processes described herein may be accomplished via individual processing modules or as a singular module in accordance with hardware limitations and availability.

The invention claimed is:

1. A method for scheduling user rate allocation of a network where the network bandwidth of multiple cellular carriers is available for scheduling the user data rate allocation, the method comprising:
   aggregating, by a server, network bandwidth for each of multiple cellular carriers into a single network for purposes of scheduling user data rate allocation of the single network;
   ordering, by the server, the multiple cellular carriers within the single network such that there is a primary carrier and one or more secondary carriers;
   receiving, by the server, first user bids for primary carrier resource allocation from multiple users for the bandwidth of the primary carrier including proposed primary carrier user data rate allocations, wherein the proposed primary carrier user data rate allocations assume a total user utility function for each of the multiple users which represents a sum of multiple application utility functions including at least one elastic application utility function and one inelastic application utility function;
   applying, by the server, a first iterative process to determine an optimal primary carrier user data rate allocation for each of the multiple users;
   receiving, by the server, second user bids for secondary carrier resource allocation from multiple users for the bandwidth of the secondary carrier including proposed secondary carrier user data rate allocations, wherein the proposed secondary carrier user data rate allocations assume a total user utility function for each of the multiple users which represents a sum of multiple application utility functions including at least one elastic application utility function and one inelastic application utility function;
   applying, by the server, a second iterative process to determine an optimal secondary carrier user data rate allocation for each of the multiple users; and
   adjusting the total user utility function for each of the multiple users in accordance with one or both of the optimal primary carrier user rate allocation and the optimal secondary user data rate allocation; and
   allocating, by the server, user data rates to each of the multiple users in accordance with the adjusted total user utility function.

2. The method of claim 1, wherein the first and second iterative processes determine multiple possible primary and secondary carrier user solutions and the optimal primary and secondary carrier user data rate allocations are selected in accordance with which of the multiple possible primary and secondary carrier user solutions is closest to an initial primary and initial secondary carrier network data rate allocation input to the first and second iterative processes as part of the first and second user bids.

3. The method according to claim 1, wherein the first iterative process, frankKelly$_{Modified}$, includes the following:

$$p = \frac{\sum_{i=1}^{n} w_i}{R}$$

$$r_i = \frac{w_i}{p} = \frac{w_i}{\sum_{j=1}^{n} w_j} R$$

$$\max[U_i(r_i) - r_i p]$$

$$U_i'(r_{i,opt}) = p$$

while $r_i \neq r_{i,opt}$ do $$w_i = r_{i,opt} p$$

$$p = \frac{\sum_{i=1}^{n} w_i}{R}$$

$$r_i = \frac{w_i}{p} = \frac{w_i}{\sum_{j=1}^{n} w_j} R$$

$$\max[U_i(r_i) - r_i p]$$

$$U_i'(r_{i,opt}) = p$$

$$r_{i,opt} = \mathrm{argmin}(|r_{i,opt} - r_i|)$$

end while wherein R is the total data rate available on the primary network resources and the sum of bids is represented in $\Sigma_{i=1}^{n} w_i$, where $w_i$=initial bid of user i, $r_{i,opt}$ is the optimal rate allocation as determined by user i given p as a shadow price which is a primary network resource price resulting from a demand on the primary network resources in the form of first user bids, and $U_i$ and $U_i'$ as the utility function and its derivative for user i.

4. The method according to claim 2, wherein adjusting by the server the total user utility function to account for the optimal primary carrier user data rate allocation for the user i is determined by the following:

$$U_{total,Carrier2,i}(r) = U_{total,i}(r + r_{allocated,Carrier1,i})$$

where $U_{total,Carrier2,i}(r)$ is the adjusted utility function for user X on the secondary carrier (carrier 2), $U_{total,i}$ is the total utility function for user i and $r_{allocated,Carrier1,i}$ is the optimal primary carrier user rate allocated to user i on the primary carrier (carrier 1).

5. The method according to claim 3, wherein the second iterative process includes:

$$\text{rates}_{Carrier1} = \text{frankKelly}_{Modified}(U'_{total,Carrier1}(r), w_1)$$

for $i=1:n$ do $$U_{total,Carrier2,i}'(r) = U_{total,i}'(r + r_{allocated,Carrier1,i})$$

end for $$\text{rates}_{Carrier2} = \text{frankKelly}_{Modified}(U_{total,Carrier2}'(r), w_2)$$

wherein $U_{total,i}'$ is the derivative of the total utility function for user i, and $w_k$ is the vector of user bids for carrier k, which is sequentially carrier 1 and carrier 2.

6. The method according to claim 1, wherein the ordering is determined using at least one of availability of each of the multiple cellular carriers and frequency band preference.

7. The method according to claim 1, wherein the sum of multiple application utility functions further includes a combination elastic and inelastic functions where a minimum data rate is initially required, but after that minimum data rate, the utility function resembles an elastic utility functions.

* * * * *